United States Patent
Sitdykova

(10) Patent No.: US 11,334,580 B1
(45) Date of Patent: May 17, 2022

(54) SYSTEM AND METHOD FOR DYNAMICALLY SORTING GEOGRAPHIC LOCATIONS ACCORDING TO USERS' SPECIFIC PREFERENCES AND IMPORTANCE TO THE USER

(71) Applicant: Nefeli Group LLC, Oak Park, CA (US)

(72) Inventor: Giselle Sitdykova, Oak Park, CA (US)

(73) Assignee: Nefeli Group LLC, Oak Park, CA (US)

( * ) Notice: Subject to any disclaimer, the term of this patent is extended or adjusted under 35 U.S.C. 154(b) by 0 days.

(21) Appl. No.: 17/307,979

(22) Filed: May 4, 2021

(51) Int. Cl.
*G06F 16/2457* (2019.01)
*G06F 16/29* (2019.01)
*G06F 16/2455* (2019.01)

(52) U.S. Cl.
CPC .. *G06F 16/24578* (2019.01); *G06F 16/24553* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 5,948,040 A * | 9/1999 | DeLorme | G09B 29/106 701/426 |
| 7,043,501 B2 | 5/2006 | Schiller | |
| 7,680,859 B2 | 3/2010 | Schiller | |
| 7,945,582 B2 * | 5/2011 | Ubalde | G06Q 30/0205 707/770 |
| 8,376,755 B2 | 2/2013 | Schiller | |
| 8,892,455 B2 * | 11/2014 | Lerner | G06Q 10/047 705/7.34 |
| 2008/0103804 A1 * | 5/2008 | Latta | G06Q 10/06 705/1.1 |
| 2012/0330714 A1 * | 12/2012 | Malaviya | G06Q 40/06 705/7.29 |
| 2015/0019587 A1 | 1/2015 | Schiller | |
| 2018/0260916 A1 * | 9/2018 | Zaltzman | G06Q 30/0643 |
| 2021/0136537 A1 * | 5/2021 | Zaltzman | G06F 3/0485 |

* cited by examiner

*Primary Examiner* — James E Richardson
*Assistant Examiner* — Cheryl M Shechtman
(74) *Attorney, Agent, or Firm* — Jubin Dana; Dana Legal Services

(57) ABSTRACT

A system and method that given a user preference will create a list of geographic locations that are the closest matches to the user's criteria. Based on the user specified importance of one or more categories and advanced metrics, locations are ranked. Climate category is ranked by estimating the number of days the user will be comfortable per year. Budget category is estimated based on if user wants to save money, have approximately the same cost of living, or pay more for improved lifestyle. For diversity metric, ranking is based on diverse or a specific ethnicity.

20 Claims, 33 Drawing Sheets

US 11,334,580 B1

SYSTEM AND METHOD FOR DYNAMICALLY SORTING GEOGRAPHIC LOCATIONS ACCORDING TO USERS' SPECIFIC PREFERENCES AND IMPORTANCE TO THE USER

FIELD OF THE INVENTION

The invention is in the field of computer systems and, more specifically, related to using user preferences to select a geographic location.

BACKGROUND

Traditionally, when a person is searching to relocate their household to another location, they have a list of locations they are considering relocating to. For example, a person will know the locations where their skill set is in demand. For another example, a high school student will know the locations of the colleges they would like to attend. As such, current tools to find a new household location are targeted toward helping people that know the locations they want to live. Furthermore, current tools have a ridged location ranking structure that lack the flexibility for users to express the user's preference.

As remote working is becoming an option for more of the workforce, people are given more freedom in selecting where to locate their household. A challenge in finding a new location for a household is being able to factor in the persons preference to find a list of locations that meets the persons criteria (e.g., climate, cost of living, etc.). Additionally, when a person wants to immigrate to a new country, unless the person has contacts in the country they are looking to immigrate to, the person is often challenged to determine where in the new country to live. Therefore, what is needed is a system and a method that given a user preference will create a list of locations that meet the user's criteria ranked by the closest matches to the user's criteria.

SUMMARY OF THE INVENTION

The invention discloses a system and a method that given a user preference will create a list of locations that meet the user's criteria ranked by the closest matches to the user's criteria. Benefits of the system and the method may include allowing the user to select geographic locations to relocate the user's household based on the user's preference, simplified user interface that allows user to drill down into the aspects that are most important to the user, and to compare locations based on the most important aspects to the user, and various other benefits.

According to one or more embodiments and aspects of the invention, the user will specify the user's preference of relative importance for one or more geographic location categories. For example, geographic location categories can include budget, local infrastructure and government, demographics, risk, education, and climate. Each advanced category specific metric may have a default value that the user can change. For each geographic location category, the user may specify advanced category specific metrics. The user may also remove advanced category specific metrics. Geographic locations are ranked based on the user specified preference of relative important for each geographic location category and the advanced category specific metrics. The geographic locations may be all locations stored in a database and user specified (e.g., for country, region, state, etc.). After ranking, the geographic locations are presented to the user. According to one or more embodiments and aspects of the invention, the user can specify household information (e.g., location, annual income, number of adults, number of children, rent/own, etc.). According to one or more embodiments and aspects of the invention, the household information may be estimated (e.g., based in the Internet Protocol (IP) address of the user).

According to one or more embodiments and aspects of the invention, geographic locations may be ranked based on a location score for each location. A category value is calculated for each location based on the user specified metrics and/or default advanced metrics. Category weight is calculated based on user specified user preference of relative importance for each category. Location score is calculated based on category value and category weight.

According to one or more embodiments and aspects of the invention, the ranked results may be shown to the user on a map where geographic regions show the count of locations that satisfy the user's preference. According to one or more embodiments and aspects of the invention, when no locations satisfy the user's preference, the closest matching locations are shown. According to one or more embodiments and aspects of the invention, only a predetermined amount of the highest ranked locations is shown (e.g., top 20 percent). According to one or more embodiments and aspects of the invention, two or more locations may be compared side by side, and the user may select a category to see expanded details.

According to one or more embodiments and aspects of the invention, the user is presented with one or more advanced metrics. The user can adjust the values for the advanced metrics and can remove metrics that do not apply to the user's preference. An advanced metric score is calculated for each advanced metric and the advanced metric score is used to calculate the respective category value.

According to one or more embodiments and aspects of the invention, the user may be presented with one or more advanced climate metrics. The user will specify preference by adjusting metrics and removing metrics that do not apply to the user's preference. Based on the user's preference, the comfortable number of days per year is calculated for each geographic location. The climate category value is calculated based on the number of days per year the user will be comfortable.

According to one or more embodiments and aspects of the invention, the user may specify the user's preference of saving money by moving to a new location or willing to pay for a nicer lifestyle when moving to a new location. The user specifies the relative importance of saving money and paying for improved lifestyle. The user's financial information is either obtained from the user or estimated. The budget is estimated for each geographic location using the user's financial information and the cost of each location (e.g., cost of living, taxes, childcare costs, etc.). Budget category score is calculated for each geographic location based on the user specified relative importance of saving money and paying for improved lifestyle, obtained and/or estimated user financial information, and budget.

According to one or more embodiments and aspects of the invention, the user may specify ethnic preference as one of diverse or a specific ethnicity. For each geographic location, the fraction of each ethnic group is calculated. If the user selected diverse, then diversity is calculated based on a fraction of ethnic group and one or more ethnic advanced metric scores. If the user selected a specific ethnicity, ethnic advanced metric score is calculated from fraction of ethnic group. According to one or more embodiments and aspects of the invention, more than one ethnicity may be specified. According to one or more embodiments and aspects of the invention, the preceding ethnicity algorithm can be used for other applications (e.g., user occupation and industries).

According to one or more embodiments and aspects of the invention, water quality can be estimated based on previous violations of the water utility company. Water violations are retrieved based on time of violation for water utility service provider. Water service coverage area is estimated based on proximity of municipality center and utility location. A water quality advanced metric is calculated based on water service coverage area, number of violations, and date of violations. According to one or more embodiments and aspects of the invention, more recent violations are given a higher weight.

BRIEF DESCRIPTION OF THE DRAWINGS

In order to more fully understand the invention, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

As used herein, in general, the term "advance metric" referrers to metrics associated with a geographic location category. "Advance" in "Advance Metric" is used to illustrate the embodiments using a hierarchal display of information to the user and does not limit the scope of the metrics.

Figure 1:
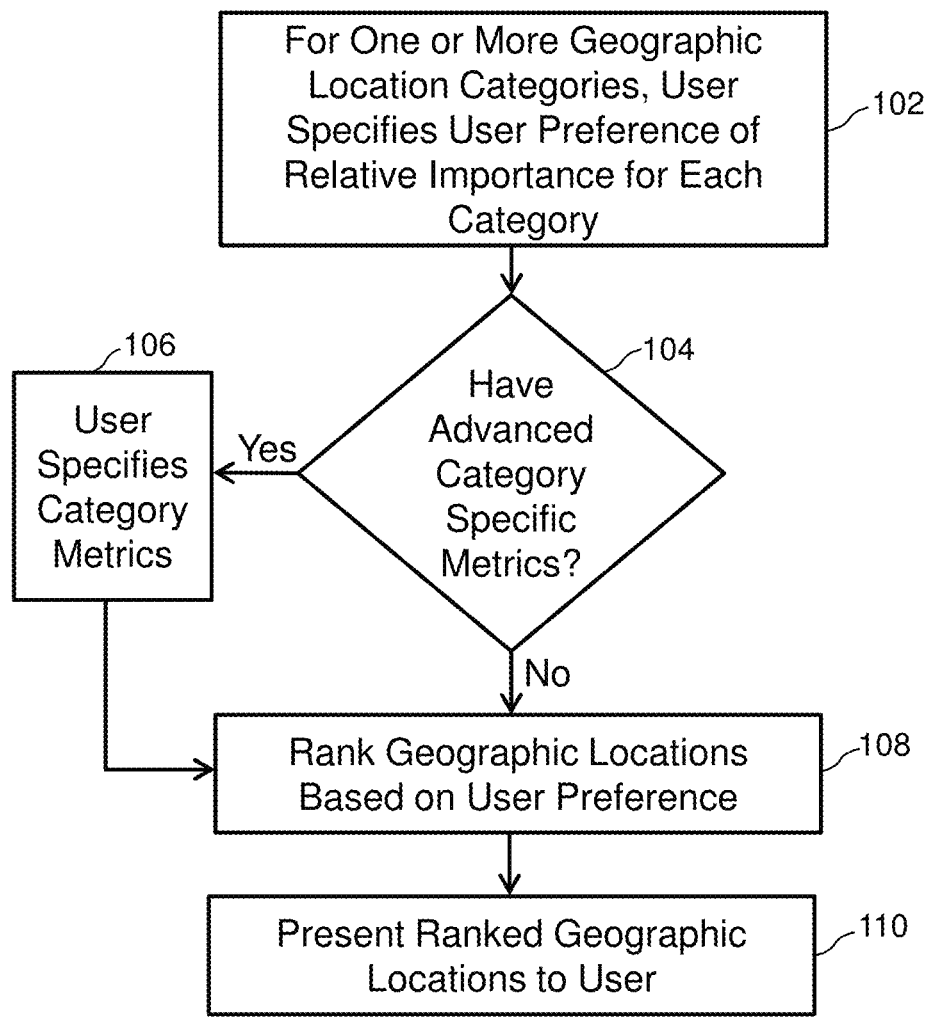
FIG. 1 shows ranking geographic locations based on user preferences for various categories, in accordance with the various aspects and embodiments of the invention.

Referring to FIG. 1, a geographic location ranking process is shown, according to one or more embodiments and aspects of the invention. The user may specify which locations to rank (e.g., specific list of locations, all locations in database, continent, country, region of country, state, city, town, neighborhood, etc.). At step 102, for one or more geographic location categories, a user specifies user preference of relative importance for each category. According to one or more embodiments and aspects of the invention, geographic location categories may include at least one of budget, climate, local infrastructure and government, demographics, risks (e.g., health risk, natural disaster, etc.), and education. According to one or more embodiments and aspects of the invention, the user may specify the user's preference for a category by defining a range. For example, the user may adjust a slider to specify the user's preference for a category. For another example, the user may adjust a slider that goes from the minimum range of 0 to a max range of 1. For another example, the user may adjust a slider that goes from the minimum range of 0% to a max range of 100%. For an additional example, the user may specify budget has an importance of 1 via a budget slider, climate has an importance of 0.8 via a climate slider, local infrastructure and government has an importance of 0.6 via a local infrastructure and government slider, demographic has an importance of 0.4 via a demographic slider, risk has an importance of 0.3 via a risk slider, and education has an importance of 0 via an education slider. According to one or more embodiments and aspects of the invention, the slider may provide a visual cue to help the user select the appropriate level of user preference. For example, when adjusting the user preference for the budget category, the slider may show "I pay for my comfort" when the slider range is between 0 and 0.2, show "match my income and comfort" at 0.5, etc.

According to one or more embodiments and aspects of the invention, the user may remove categories that does not apply to the user's preference. For example, if a user has completed all the education the user desires and does not have nor does not plan to have children in the future, the user may remove the education category. In the alternative, the user may set the education slider to zero which causes education not to be included in the location ranking. According to one or more embodiments and aspects of the invention, the relative importance for each category may be given a default value. For example, the default relative importance may be set to mid-range, set to be similar to the user's current location, based on previous usage, random value, etc. According to one or more embodiments and aspects of the invention, advanced metrics may be removed by the user. For example, a retired person with adult children may not be interested in the elementary and high schools thus the retired person may remove these advanced metrics.

At step 104, a determination is made if the user wants to specify advanced category specific metrics. Advanced category specific metrics are discussed in more detail in in relation to FIG. 6. When step 104 is determined to be a yes, step 106 is performed and when step 104 is determined to be a no, step 108 is performed.

At step 106 the user specifies the category metrics via an advanced metric dialog. According to one or more embodiments and aspects of the invention, the user may specify a range for a metric (e.g., user is comfortable between 78 degrees F. and 88 degrees F.). According to one or more embodiments and aspects of the invention, each geographic location category may have a separate advanced metric dialog. Once the user has specified all the category metrics the user wishes, step 108 is performed.

At step 108, geographic locations are ranked based on the user preference of relative importance for each category and advanced metrics. According to one or more embodiments and aspects of the invention, for one or more locations, a location score is calculated. The location score is used to rank the locations. According to one or more embodiments and aspects of the invention, for each geographic location category, category value score is calculated based on user specified advanced metrics and/or default metric values. The category weight is calculated based on user specified user preference of relative importance for each geographic location category. The location score is calculated based on category value and category weight. The ranking is discussed in more detail in relation to FIG. 3.

At step 110, the ranked geographic locations are presented to the user. According to one or more embodiments and aspects of the invention, the user is shown a map with a count of how many geographic locations match a certain user preference threshold within a geographic area. According to one or more embodiments and aspects of the invention, when no locations meeting the user preference are found, a certain percent of the highest ranking locations may be displayed. According to one or more embodiments and aspects of the invention, the top ranked search results may be shown to the user (e.g., top 10% of rankings, top 20% of rankings, etc.). According to one or more embodiments and aspects of the invention, the user may select any locations to compare (e.g., current location to best match, two locations, etc.). According to one or more embodiments and aspects of the invention, the ranking may include a preference score for each location to show the user how close each location is to user's preference. For example, a score of 100 could mean a location matches every one of the user's preferences and a score of 0 could mean a location matches none of the user's preference. The user may select the geographic location to get specific details of the selected geographic location. The user presentation is discussed in more detail in relation to FIG. 4 and FIG. 5.

Figure 2:
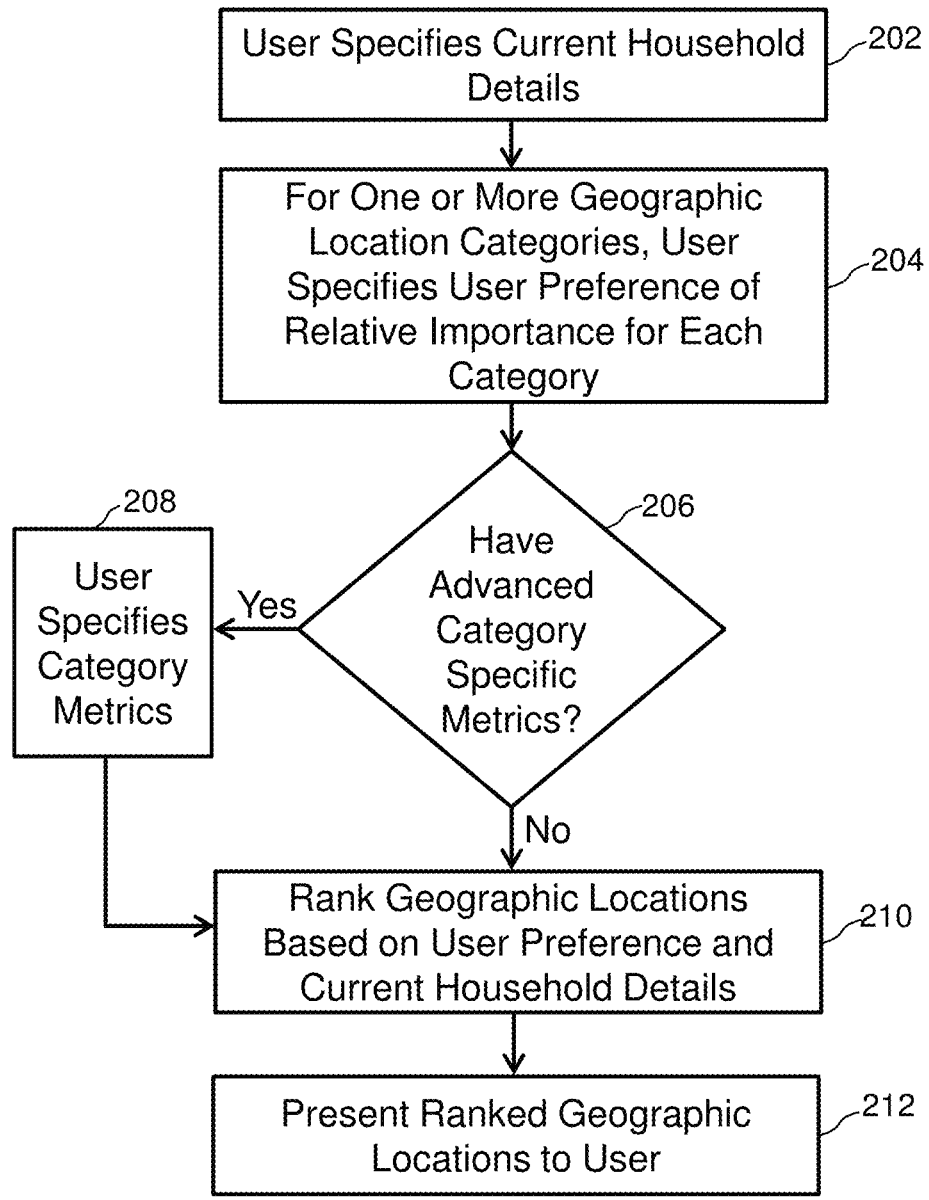
FIG. 2 shows ranking geographic locations based on user preferences for various categories and user household details, in accordance with the various aspects and embodiments of the invention.

Referring to FIG. 2, a geographic location ranking process based on user preferences for various categories and user household details is shown, according to one or more embodiments and aspects of the invention. At step 202, the user specifies one or more details about the user's current household. According to one or more embodiments and aspects of the invention, household details include at least one of user city, user state, user income (e.g., household income), housing costs, number of adults in the household, number of children, number of infants, expected children in the future (e.g., newborn infants, adopted, etc.), own home vs renting, housing costs (mortgage payment, rent payment, etc.), property maintenance cost, child care cost, heating and cooling cost (e.g., annual, quarterly, monthly, etc.), sales tax, other expenses, etc. According to one or more embodiments and aspects of the invention, household details may be used to calculate one or more advanced metrics. According to one or more embodiments and aspects of the invention, household details may be used to calculate one or more advanced metric scores. According to one or more embodiments and aspects of the invention, household details may be given default values (e.g., based on the user present location). According to one or more embodiments and aspects of the invention, the user may remove one or more household details.

At step 204, for one or more geographic location categories, a user specifies user preference of relative importance for each category. Step 204 may be the same or similar to step 102. At step 206, a determination is made if the user wants to specify advanced category specific metrics. Step 206 may be the same or similar to step 104. When step 206 is determined to be a yes, step 208 is performed and when step 206 is determined to be a no, step 210 is performed. At step 208 the user specifies the category metrics via an advanced metric dialog. Step 208 may be the same or similar to step 106. At step 210, geographic locations are ranked based on the user preference of relative importance for each category and advanced metrics. Step 210 may be the same or similar to step 108. At step 212, the ranked geographic locations are presented to the user. Step 212 may be the same or similar to step 110.

Figure 3:
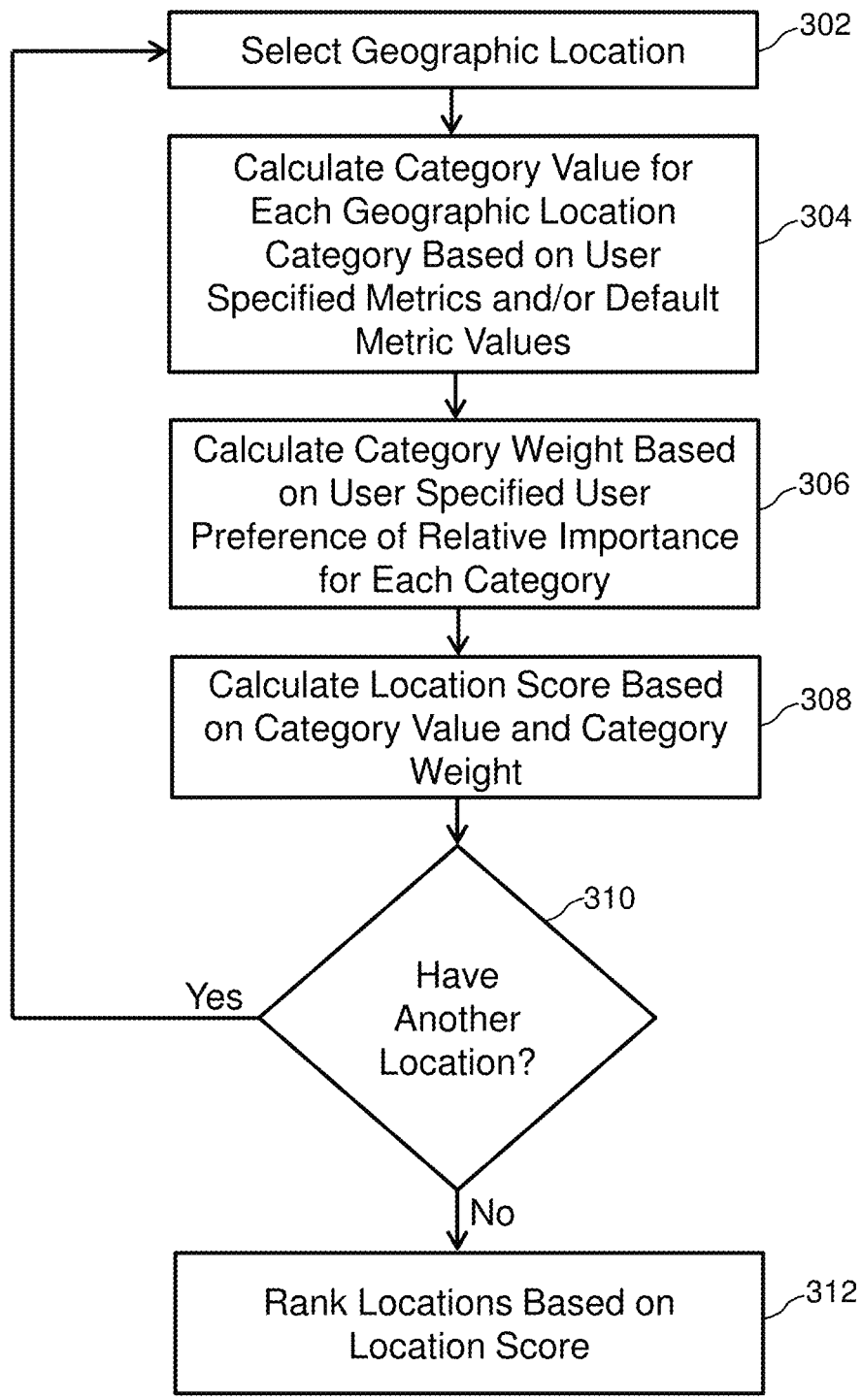
FIG. 3 shows calculating geographic location score for various locations and ranking locations, in accordance with the various aspects and embodiments of the invention.

Referring to FIG. 3, calculating geographic location score for various locations and ranking locations is shown, in accordance with the various aspects and embodiments of the invention. At step 302, a geographic location is selected. According to one or more embodiments and aspects of the invention, the geographic location may be selected as all locations in a database. According to one or more embodiments and aspects of the invention, the location may be selected based on user input (e.g., specific location, list of locations, locations within a geographic region, etc.).

At step 304, for each geographic location category, a category value is calculated based on user specified advanced metrics and/or default advanced metric values. According to one or more embodiments and aspects of the invention, category value may be the sum of advanced metric scores normalized for a specific range of values. According to one or more embodiments and aspects of the invention, category value may be the average of advanced metric scores.

At step 306, for each geographic location category, relative importance for each category is calculated. According to one or more embodiments and aspects of the invention, the relative importance for each category may be specified by the user. According to one or more embodiments and aspects of the invention, a relative importance for a category is multiplied by a constant. For example, the relative importance of a budget category may be multiplied by 10 to increase the overall weight of the budget category.

At step 308, location score is calculated based on category value and category weight. According to one or more embodiments and aspects of the invention, location score is the sum of the respective category value times the respective category weight divided by the number of categories. According to one or more embodiments and aspects of the invention, certain categories may have the category value and category weight calculation replaced with other calculations. For example, the budget may use the user's relative importance of saving money and paying for improved lifestyle instead of a category weight.

At step 310, it is determined if there is another location to calculate the location score. If at step 310 it is determined there is another location, step 302 is repeated for the new location. If at step 310, there is no more locations to calculate the location score, step 312 is performed. At step 312, the locations are ranked based on the location score. Step 312 may be the same or similar to step 108 and/or step 210. Though steps 302 through 308 are being taught to be performed in a serial manner, steps 302 through 308 may be ran in parallel where multiple location scores are calculated simultaneously. According to one or more embodiments and aspects of the invention, each category may rank the cities individually and an overall ranking can be done based on the rankings of each category.

Figure 4:
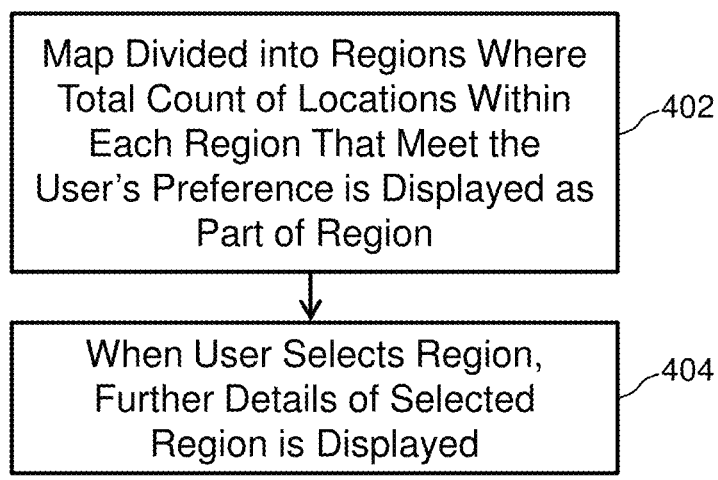
FIG. 4 shows displaying various locations to a user and allowing user to further specify a location to obtain additional details, in accordance with the various aspects and embodiments of the invention.

Referring to FIG. 4, the user is presented with various locations and allowed to specify a location to obtain additional details, in accordance with the various aspects and embodiments of the invention. At step 402, a map is divided into regions where the total count of locations within each region that meet the user's preference is displayed as part of each region. For example, a map of the United States of America is displayed and each state contains a number of the total count of locations within a state that meet the user's preference. According to one or more embodiments and aspects of the invention, when no locations meeting the user preference are found, a certain percent of the highest ranking locations may be displayed. At step 404, a user selects a region to gain further details of the selected region. For example, the user may click the state of California within a map of the United States of America and information about the counties within California may be displayed (e.g., each county can have the total number of locations that that meet a user's preference).

According to one or more embodiments and aspects of the invention, filters may be used to modify the ranked geographic locations displayed to the user. For example, the user may filter locations (e.g., exclude results over 100 miles away from the present location of the user). According to one or more embodiments and aspects of the invention, filters may be used to modify the list of ranked geographic locations displayed to the user. For example, the user may filter location set (e.g., exclude results over 100 miles away from the present location of the user). According to one or more embodiments and aspects of the invention, the user may further refine the category weights and/or advanced metrics to the user's preference.

Figure 5:
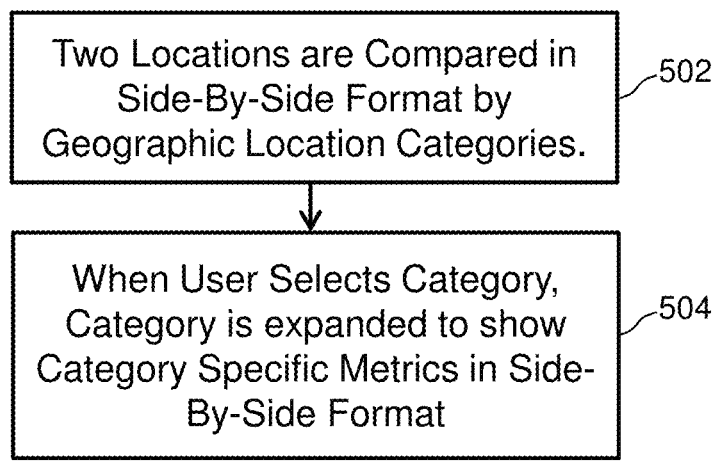
FIG. 5 shows comparing two locations and allowing additional details of the locations to be shown, in accordance with the various aspects and embodiments of the invention.

Referring to FIG. 5, two locations are compared and the user is allowed to retrieve more details about a location, in accordance with the various aspects and embodiments of the invention. At step 502, two locations are compared in a side-by-side format by geographic location categories. For example, the city of San Francisco, Calif. can be compared to San Diego, Calif. In this example, the geographic location categories are budget, climate, local infrastructure and government, demographics, risks (e.g., crime rate), and education. At step 504, when the user selects a category, the category is expanded to show category specific advanced metrics. According to one or more embodiments and aspects of the invention, category specific advanced metrics may be shown side by side. To continue the previous example, when the user selects the climate category, climate specific metrics are shown. For example, the user can see how each location compares to the user's comfortable temperature range. According to one or more embodiments and aspects of the invention, any number of geographic locations can be compared. For example, the user's current location can be compared to the top ranking location. For another example, the user's current location can be compared to locations within a certain distance (e.g., within 100 miles of the user's location). For another example, 3 or more locations can be compared. For an additional example, the user can see how close their current location is to their preference.

Figure 6:
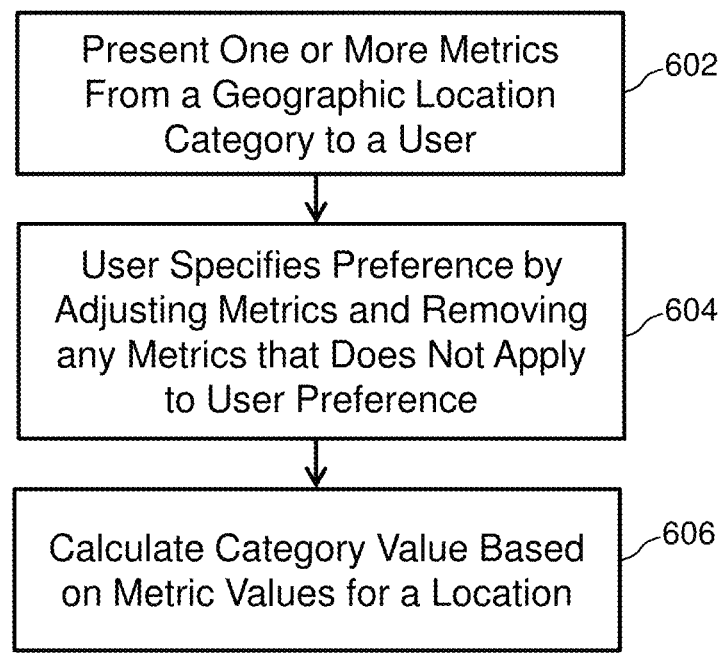
FIG. 6 shows displaying advanced metrics to user and allowing user to further refine the advanced metrics, in accordance with the various aspects and embodiments of the invention.

Referring to FIG. 6, displaying advanced metrics to user and allowing user to further refine the advanced metrics is shown, in accordance with the various aspects and embodiments of the invention. At step 602, one or more advanced metrics for a geographic location category is presented to the user. According to one or more embodiments and aspects of the invention, associated with each geographic location category is an advanced metric dialog. The advanced metric dialog may be initiated by clicking a button, touching a screen, hovering over the geographic location category, clicking in the geographic location category, a shortcut key, a spoken command, and any other way for the user to initiate the advanced dialog box for a specific category. According to one or more embodiments and aspects of the invention, the user may specify advanced metrics for multiple geographic location categories. For example, the user may select "add custom settings" button near the budget slider to open the advanced metrics dialog for budget. After closing the budget dialog, the user may select "add custom setting" near the education slider to open the advanced metrics dialog for education. According to one or more embodiments and aspects of the invention, each advanced metric may have a default value. For example, each default advanced metric value may be set to mid-range, set to be similar to the user's current location, based on previous usage, random value, etc. According to one or more embodiments and aspects of the invention, advanced metrics may be shared between two or more geographic location categories. According to one or more embodiments and aspects of the invention, the user may define a custom geographic location category and assign advanced metrics to the custom geographic location category. According to one or more embodiments and aspects of the invention, the user may move advanced metrics between geographic location categories.

According to one or more embodiments and aspects of the invention, the budget geographic location category may have one or more of the following advanced metrics: user's city, user state, user income (e.g., household income), number of adults in the household, number of children, number of infants, expected children in the future (e.g., new born infants, adopted, etc.), own home vs renting, house type (e.g., ranch, two story, condominium, etc.), number of bedrooms in a home, number of bathrooms in a home (e.g., full baths, half baths, etc.), house size (e.g., square footage), lot size (e.g., square feet, square acres, etc.), price per unit (e.g., house price per square foot, price of lot per square acre, etc.), vacant real estate (e.g., percent vacant, number of vacant, etc.), housing costs (e.g., mortgage payment, rent payment, etc.), child care expense, heating and cooling cost (e.g., annual, monthly, quarterly, etc.), sales tax, other expenses, property maintenance costs, elevation of the location (e.g., feet above sea level), proximity to golf clubs, proximity to sporting arenas (e.g., football, basketball, etc.), proximity to events (e.g., concert venue, festivals, etc.), proximity to children playgrounds, proximity to national forests, proximity to tourist attractions (e.g., national monuments, etc.), number of food venues within a given range (e.g., count of all restaurants within 10 miles, count family style restaurants within 20 miles, etc.), migration (e.g., number of people moving into location, number of people moving out of location, percent of people moving into location, percent of people moving out of location, etc.), gasoline cost, electricity cost, water cost, propane costs, utility cost, minimum wage, healthcare cost (e.g., for a typical person, age group, etc.), and any other advanced metrics used to estimate a budget.

According to one or more embodiments and aspects of the invention, the climate geographic location category may have one or more of the following advanced metrics: range of temperatures the user is comfortable, range of humidity the user is comfortable, range of wind the user is comfortable, maximum number of cloudy days the user will be comfortable with, maximum number of rainy days the user will be comfortable with, maximum number of snow-covered days the user to will comfortable with, number of hours of daylight per day the user will be comfortable with, and any other advanced metrics used to calculate climate comfort. According to one or more embodiments and aspects of the invention, climate metrics can be transformed (e.g., comfortable days transformed to uncomfortable days, maximum to minimum, etc.).

According to one or more embodiments and aspects of the invention, rainfall is classified as light, moderate, or heavy.

Light rainfall may be considered less than 0.10 inches of rain per hour. Moderate rainfall may be considered 0.10 to 0.30 inches of rain per hour. Heavy rainfall may be considered more than 0.30 inches of rain per hour. According to one or more embodiments and aspects of the invention, to estimate rainy days per year, rain is considered to be a constant inches per hour. According to one or more embodiments and aspects of the invention, to estimate rainy days per year, rain is considered to be 0.2 inches per hour. According to one or more embodiments and aspects of the invention, to estimate rainy days per year, the total yearly rainfall is divided by rain in inches per hour (e.g., 0.2 inches per hour) divided by a time period (e.g., 24 hours). According to one or more embodiments and aspects of the invention, to estimate rainy days per year, an average rain time (e.g., national, regional, local, etc.) may be used.

According to one or more embodiments and aspects of the invention, the local infrastructure and government geographic location category may have one or more of the following advance metrics: distance to the nearest airport (e.g., commercial airport), distance to nearest coast, city type, time zone, land to water (e.g., percent of water in a given location), land use (e.g., percent of open space in a given location), home ownership rate, number of homeless people (e.g., sheltered, unsheltered, total, etc.), internet speed (e.g., mobile, wireless, hard wired, etc.), road density rank (e.g., road coverage and size), traffic rank, government spend per capita (e.g., state government, local government, agency type, etc.), political party affiliation, credit rating (e.g., city, county, state, etc.), and any other advanced metrics used to calculate infrastructure and government geographic category score. According to one or more embodiments and aspects of the invention, a sidewalk advanced metric score may be determined at least partially based on characteristics of the sidewalk (e.g., continuous between roads, length, size, etc.).

According to one or more embodiments and aspects of the invention, homeless data may be reported under a continuum of care (CoC) which may include multiple cities and/or multiple counties. The CoC homeless data may be attributed to the individual cities. For example, CoC homeless data may be attributed to each location based on the overall population of the city. For another example, CoC homeless data may be attributed to a location based on a higher overall population density and/or proximity to a body of water.

According to one or more embodiments and aspects of the invention, the local demographics geographic location category may have one or more of the following advance metrics: diverse household type, age group, child friendly neighborhood, race, religion, gender, English speaker (e.g., native), industry type, occupation type, highest education of person (e.g., typical person), and science, technology, engineering, math (STEM) education, education level (e.g., high school, bachelors, master, etc.), college degree type, occupation of workers, industry of workers, birth rate, retired workers (e.g., number, percent, etc.), and any other advanced metrics used to calculate demographic geographic category score. According to one or more embodiments and aspects of the invention, estimated job growth and/or jobs exiting the area may be used as advanced metrics.

According to one or more embodiments and aspects of the invention, the risk geographic location category may have one or more of the following advance metrics: national risk index (NRI) score, national disaster risk and number of events (e.g., earthquake, tornado, hurricanes, severe storms, floods, etc.), smoking at work, smoking in public (restaurants, bars, etc.), e-cigarette and Menthol cigarette banned, marijuana allowed (e.g., medical, recreational, etc.), substance abuse rank, drinking water index, air quality, poverty rate, cancer rate, cancer mortality, life expectancy, and any other advanced metrics to calculate risk geographic location category. According to one or more embodiments and aspects of the invention, crime rate (e.g., violet crime, property crime, white-collar crime, organized crime, and consensual or victimless crime) is an advanced metric. According to one or more embodiments and aspects of the invention, relative value of homes within a city may be used to determine desirability advanced metric for homes. For example, homes with a lower dollar per square foot sales price, may be in less desirable areas.

According to one or more embodiments and aspects of the invention, air quality advanced metric may be estimated by taking cities where the air quality is known and interpolating for the cities where air quality is unknown. According to one or more embodiments and aspects of the invention, air quality advanced metric may be estimated by taking cities where the air quality is known and interpolating for the cities where air quality is unknown as an average of air quality readings from the nearest air sample collection stations in proportion to the distances to each station.

According to one or more embodiments and aspects of the invention, the education geographic location category may have one or more of the following advance metrics: institute type and number of (e.g., elementary school, middle school, high school, community college, university, etc.), percent of private school, average math proficiency, average reading/language arts (RLA) proficiency, student to teacher ratio, average teacher salary, blue ribbon ranking, spelling bee winners, STEM competition winners, non-STEM competition winners, dropout rate (e.g., high school, university, etc.), school data (e.g., university tuition, average starting salary, etc.), and any other advanced metrics to calculate education geographic location category. Each education geographic location category advanced metric can be calculated over a single institute type (e.g., elementary school) or a range of schools (e.g., elementary school through high school).

Though each of the above advanced metrics is taught as a single data point (e.g., maximum, range, Boolean, etc.), transformations of advanced metrics fall within the scope of the invention (e.g., comfortable days may be transformed to uncomfortable days, a single data point may be transformed to a range, range may be transformed into a single data point, etc.). The advanced metrics are not limited to the previous mentioned list of advanced metrics. Any metric that can be used as part of a geographic category score falls within the scope of the invention.

According to one or more embodiments and aspects of the invention, geographic location categories may be added and/or removed. According to one or more embodiments and aspects of the invention, one or more advanced metrics may be moved to another category.

At step 604, the user specifies preference by adjusting advanced metrics and removing any metrics that do not apply to the user's preference. For example, for the climate category, the default comfortable range may be between −20 and 75 degrees F. and the user may change their comfortable range to between 68 and 85 degrees F.

At step 606, the category value is calculated based on the advanced metric scores. Step 606 may be the same or similar to step 304.

Figure 7:
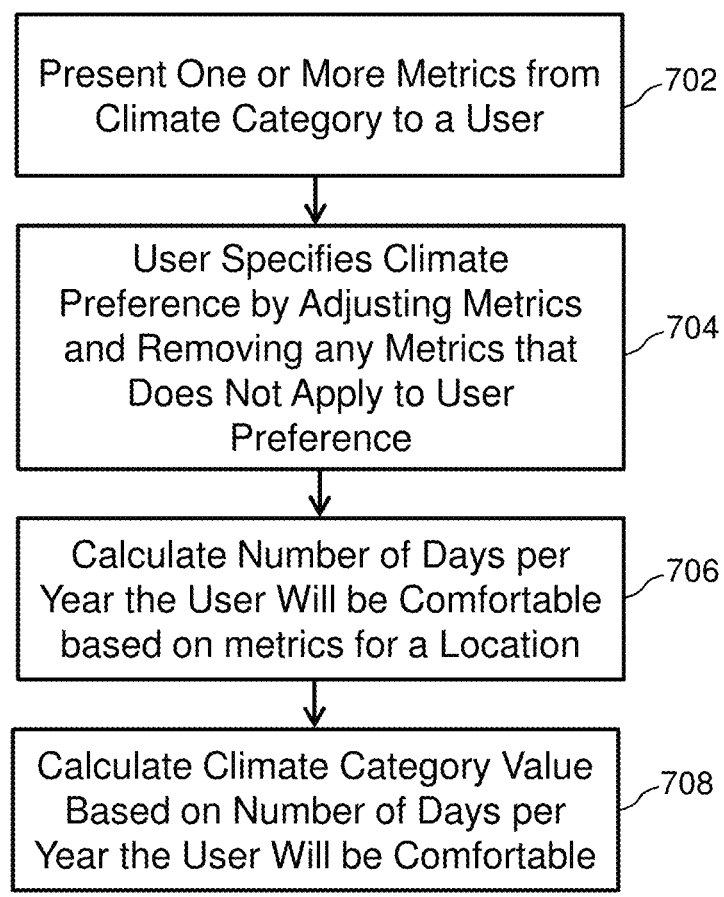
FIG. 7 shows calculating climate category score, in accordance with the various aspects and embodiments of the invention.

Referring to FIG. 7, calculating climate category score is shown, in accordance with the various aspects and embodiments of the invention. At step 702, one or more advanced metrics from the climate category is presented to the user. The climate category advanced metrics may be the same or similar as the climate category advanced metrics from step 602. At step 704, the user specifies climate preference by adjusting advanced metrics and removing any metrics that do not apply to the user's preference. At step 706, the number of days per year the user will be comfortable is calculated based on the advanced category metrics for each location. According to one or more embodiments and aspects of the invention, the number of comfortable days for a location is determined as the number of days with overlapping ranges for the user's preference. For example, if the user is comfortable in the range between 58 degrees F. and 78 degrees F., and San Francisco, Calif. is within the range for 230 days a year, then the number of comfortable days in San Francisco, Calif. is 230 days per year. According to one or more embodiments and aspects of the invention, the user may specify the date range they want to be comfortable. For example, the user may not care about the weather in the summers so long as there is less than 5 snow covered days in the winter. At step 708, the climate category value is calculated based on the number of days per year the user will be comfortable. According to one or more embodiments and aspects of the invention, the climate category value may be calculated as the number of days per year the user will be comfortable divided by the total number of days in a year.

According to one or more embodiments and aspects of the invention, to account for the correlation between snow covered days and cold days, the number of uncomfortable days with snow is subtracted from uncomfortable days due to low temperature. According to one or more embodiments and aspects of the invention, to account for the correlation between snow covered days and cold days, the number of uncomfortable days due to low temperature is subtracted from uncomfortable days with snow. According to one or more embodiments and aspects of the invention, to account for the correlation between number of days with rain and high humidity, number of uncomfortable days due to rain is subtracted from uncomfortable days due to humidity. According to one or more embodiments and aspects of the invention, to account for the correlation between number of days with rain and high humidity, number of uncomfortable days due to humidity is subtracted from uncomfortable days due to rain.

According to one or more embodiments and aspects of the invention, number of comfortable days is calculated as ((days with comfortable temperature minus uncomfortable day with snow)+(comfortable humidity days minus uncomfortable days with rain) plus comfortable wind days plus (365 minus uncomfortable number of cloudy days)) divided by four.

Figure 8:
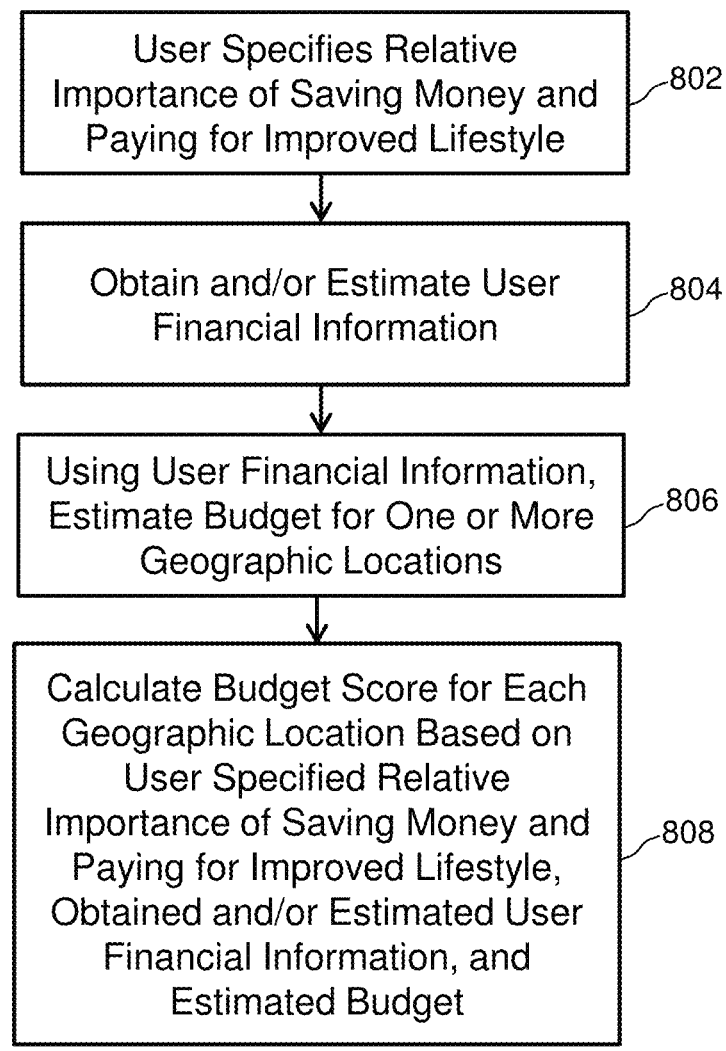
FIG. 8 shows calculating the budget category score, in accordance with the various aspects and embodiments of the invention.

Referring to FIG. 8, calculating budget category score is shown, in accordance with the various aspects and embodiments of the invention. At step 802, user specifies relative importance of saving money and paying for improved lifestyle. At step 804, financial information about the user is obtained and/or estimated.

At step 806, the budget is estimated for one or more geographic locations based on user financial information. According to one or more embodiments and aspects of the invention, budget is calculated as income minus taxes minus expenses. Expenses can cover any expense for the user, e.g., house (e.g., including current mortgage borrowing rates) or rental payment, income taxes (e.g., estimated based on number of adults, income, number of children, number of infants, expected children in the future, etc.), property tax, childcare cost, heating cost, cooling cost, sales tax (e.g., on income above living expenses), home or renters insurance premiums, car payments, credit card payments, etc. According to one or more embodiments and aspects of the invention, budget is calculated as income minus taxes minus expenses minus the expenses at the user's present location. According to one or more embodiments and aspects of the invention, the time period of the budget can be transformed into another time period. For example, yearly can be transformed to monthly, yearly can be transformed to weekly, etc. According to one or more embodiments and aspects of the invention, heating cost may be estimated based on how many degrees a house needs to be heated to maintain a certain inside temperature and the typical utility costs (e.g., national average, national range, city average, city range, etc.). According to one or more embodiments and aspects of the invention, cooling cost may be estimated based on how many degrees a house needs to be cooled to maintain a certain inside temperature and the typical utility costs (e.g., national average, national range, city average, city range, etc.).

At step 808, budget score is calculated for each geographic location based on user specified relative importance of saving money and paying for improved lifestyle, obtained and/or estimated user financial information, and estimated budget. According to one or more embodiments and aspects of the invention, the user may use a slider to specify the relative importance of saving money and paying for improved lifestyle where the minimum value of the slider represents willing to pay the most for an improved lifestyle, the maximum value of the slider represents wanting to save the most money, and the midpoint of the slider represents a similar cost of living as the user's present location. To map from the slider to the budget score a mapping function may be used. For example, slider minimum maps with the largest budget of all the locations, slider mid-point maps to the budget of the user's present location, and slider maximum maps to the smallest budget of all the locations. An interpolation function may be used to approximately map all slider values to budget score. The interpolation function may inform the user for conditions where the function does not provide accurate results. For example, if there are no cities with a lower budget than the present city, the part of the slider to save money may be dimmed out. According to one or more embodiments and aspects of the invention, the category score may be multiplied by a constant value.

According to one or more embodiments and aspects of the invention, the user may use a slider to specify the relative importance of saving money and paying for improved lifestyle where the minimum value of the slider represents willing to pay the most for an improved lifestyle, the maximum value of the slider represents wanting to save the most money, and the midpoint of the slider represents a similar cost of living as the user's present location. According to one or more embodiments and aspects of the invention, an ideal budget is calculated as the X percentile among the budget from all the locations where X is the slider value. According to one or more embodiments and aspects of the invention, an ideal budget is calculated as the minimum budget from all locations plus slider value times (maximum budget from all locations minus minimum budget from all locations) wherein the slider value is a percent between 0% and 100%. According to one or more embodiments and aspects of the invention, the further away a location budget is from the ideal budget, the lower the budget score. According to one or more embodiments and aspects of the invention, the budget score for a location is calculated as 1 minus absolute((ideal budget minus budget for location) divided by (maximum budget for all locations minus minimum budget for all locations)) where absolute is a function that returns the absolute value of the operands. According to one or more embodiments and aspects of the invention, the category score may be multiplied by a constant value.

Figure 9A:
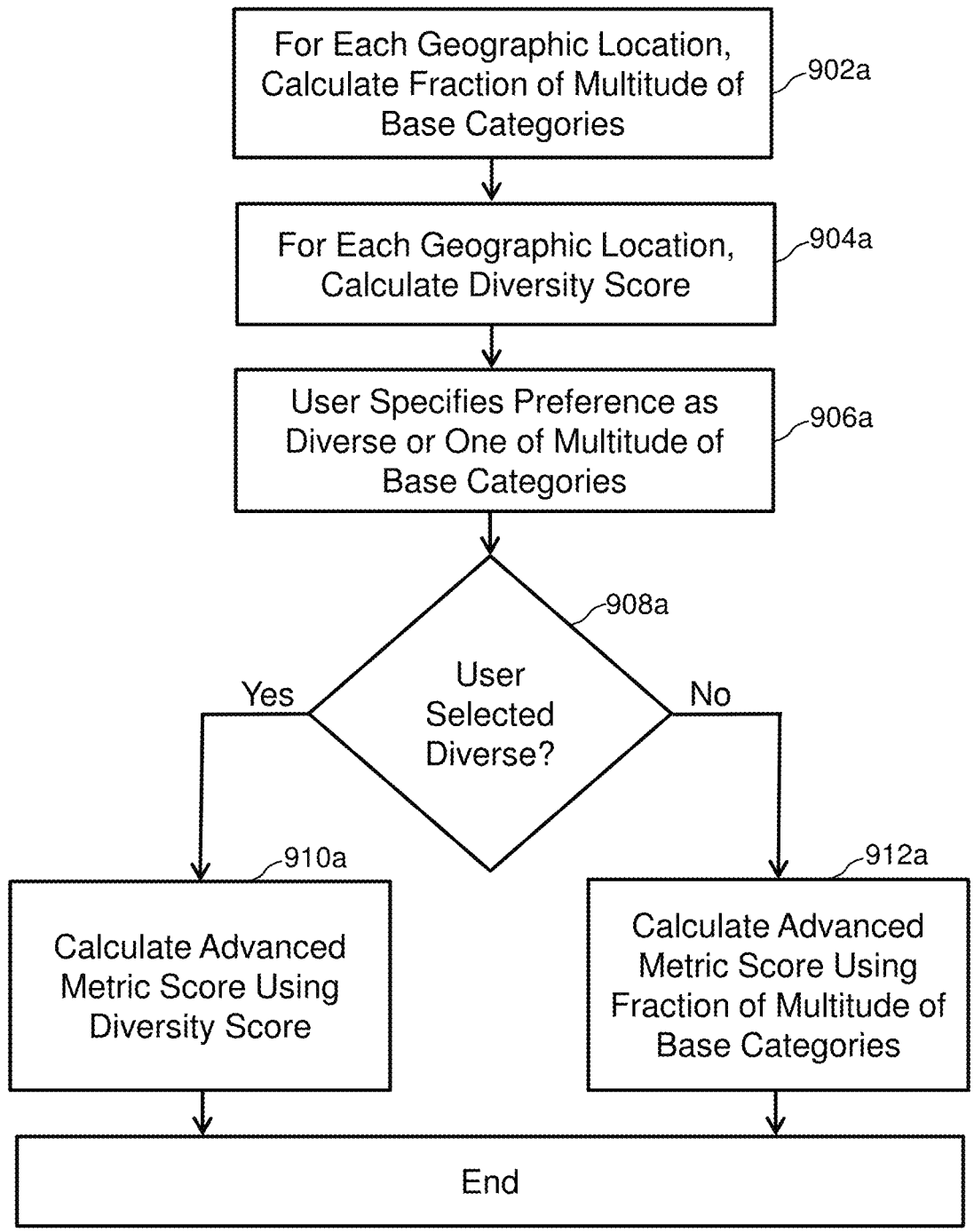
FIG. 9a shows an algorithm for calculating advanced metric score, in accordance with the various aspects and embodiments of the invention.

Referring to FIG. 9a, calculating advanced metric score is shown, in accordance with the various aspects and embodiments of the invention. At step 902a, for each geographic location, a fraction of a multitude of base categories is calculated based on the number of items in each base category. According to one or more embodiments and aspects of the invention, N is the number of geographic locations and X is the number of base categories. A matrix M is created with the size N by X. For each location, a row is created where each element is a fraction of the category total. For example, if the base categories are [A1, A2, A3, A4] and the location has 6 group A1 items, 5 group A2 items, 3 group A3 items, and 2 group A4 items then the location has 16 total items and fraction of multitude is [6/16, 5/16, 3/16, 2/16]=[0.38, 0.31, 0.19, 0.13].

At step 904a, for each geographic location, a diversity score is calculated based on fraction of a multitude of base categories. According to one or more embodiments and aspects of the invention, an array Z is calculated for each location i such that $$Z_i = \sum_{k=1}^{X} \text{abs}(M[i,k] - 1/X)$$

wherein X is the number of base categories and M is the matrix created in step 902a. The diversity array D is calculated for each location i such that D[i]=1 minus Z[i] divided by max(Z).

According to one or more embodiments and aspects of the invention, steps 902a and 904a can be done in pre-processing before the user uses the system. For example, steps 902a and 904a may be calculated and stored in a database (e.g., relational database, No-SQL, memory, cache, etc.).

At step 906a, the user specifies preference as either diverse or of a multitude of base categories. At step 908a, a determination is made if the user selected diverse. If the user selected diverse, step 910a is performed. If the user did not select diverse, step 912a is performed.

At step 910a, advanced metric score is calculated using the diversity score. According to one or more embodiments and aspects of the invention, advanced metric score is calculated at location i as 1-D[i]/max(D).

At step 912a, advanced metric score is calculated using fraction of multitude of base categories. According to one or more embodiments and aspects of the invention, advanced metric score for category j is calculated at location i as M[i,j]−min(M[:,j]) divide by (max(M[:,j])−min(M[:,j])) where M[:,j] is the column at position j that includes all locations. According to one or more embodiments and aspects of the invention, multiple base categories may be selected. For example, A1 and A2.

According to one or more embodiments and aspects of the invention, any advanced metric score capable of being classified as one of diverse and a multitude of base categories may be calculated with steps 902a to 912a. For example, ethnicity may be set to diverse or a specific ethnic group and the ethnicity advanced metric score may be calculated with steps 902a to 912a.

A person of skill in the art at the present applications filing would understand that steps 902a-912a are one way to calculate advanced metric scores and other ways of calculating advanced metric scores may be used when calculating a geographic location score.

Figure 9B:
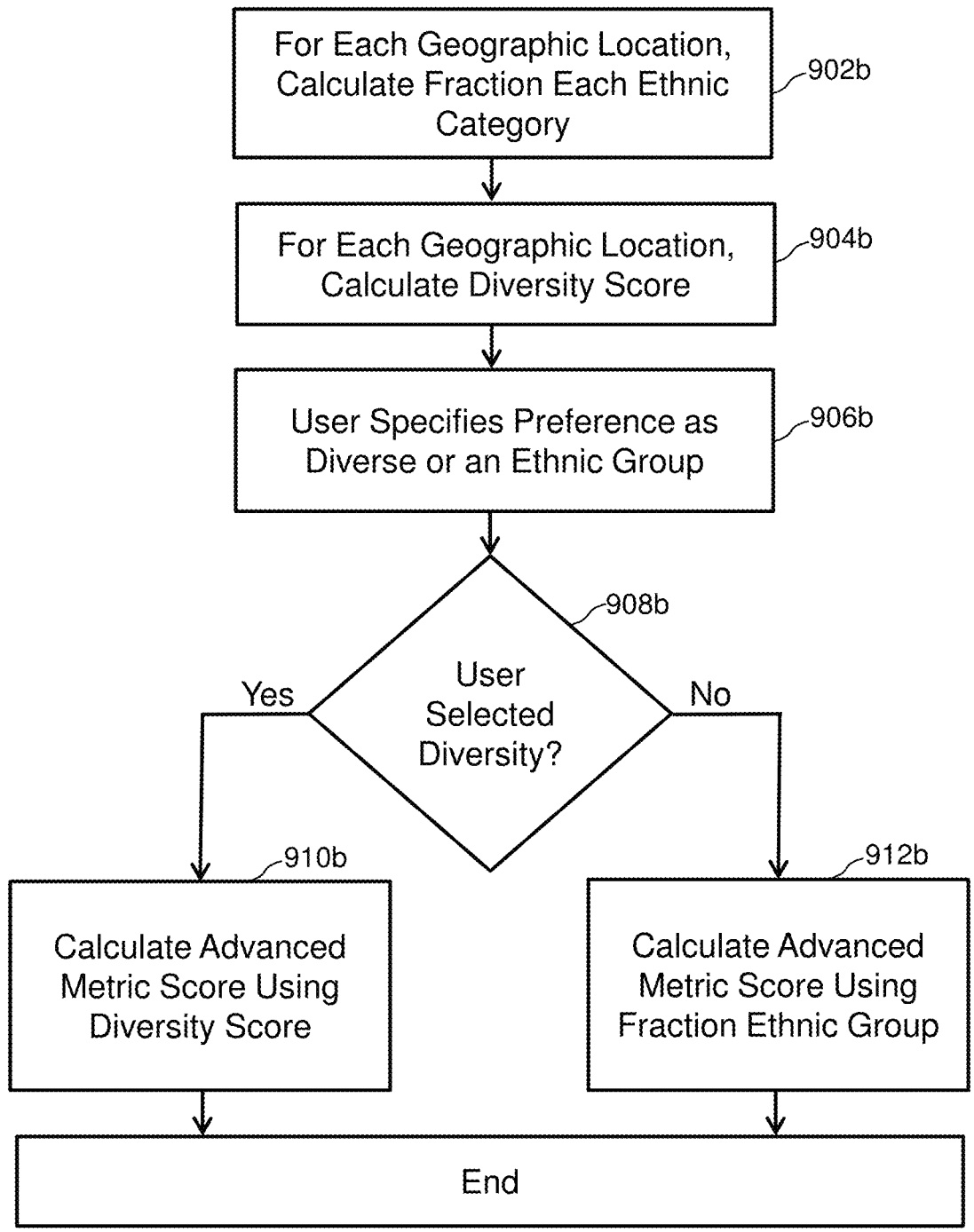
FIG. 9b shows calculating ethnic advanced metric score, in accordance with the various aspects and embodiments of the invention.

Referring to FIG. 9b, calculating ethnic advanced metric score is shown, in accordance with the various aspects and embodiments of the invention. At step 902b, for each geographic location, a fraction of each ethnic group is calculated based on the number of people in each ethnic group. For example, ethnic groups may be Caucasian, African American, Asian, Native American, etc. According to one or more embodiments and aspects of the invention, N is the number of geographic locations and X is the number of ethnic groups. A matrix M is created with the size N by X. For each location, a row is created where each element is a fraction of the ethnic group total. For example, if a location has 6 Caucasian people, 5 African American people, 3 Asian people, and 2 Native American people then the location has 16 total people and row=[6/16, 5/16, 3/16, 2/16]=[0.38, 0.31, 0.19, 0.13].

At step 904b, for each geographic location, a diversity score is calculated based on fraction of each ethnic group. According to one or more embodiments and aspects of the invention, an array Z is calculated for each location i such that $$Z_i = \sum_{k=1}^{X} \text{abs}(M[i,k] - 1/X)$$

wherein X is the number of ethnic categories and M is the matrix created in step 902b. The diversity array D is calculated for each location i such that D[i]=1 minus Z[i] divided by max(Z).

At step 906b, the user specifies preference as either diverse or a specific ethnic group. At step 908b, a determination is made if the user selected diverse. If the user selected diverse, step 910b is performed. If the user did not select diverse, step 912b is performed.

At step 910b, advanced metric score is calculated using the diversity score. According to one or more embodiments and aspects of the invention, ethnic advanced metric is calculated at location i as 1-D[i]/max(D).

At step 912b, advanced metric score is calculated using fraction of each ethnic group. According to one or more embodiments and aspects of the invention, advanced metric score for category j is calculated at location i as M[i,j]−min(M[:,j]) divide by (max(M[:,j])−min(M[:,j])) where M[:,j] is the column at position j that includes all locations. According to one or more embodiments and aspects of the invention, multiple base categories may be selected. For example, Caucasian and African American.

Figure 9C:
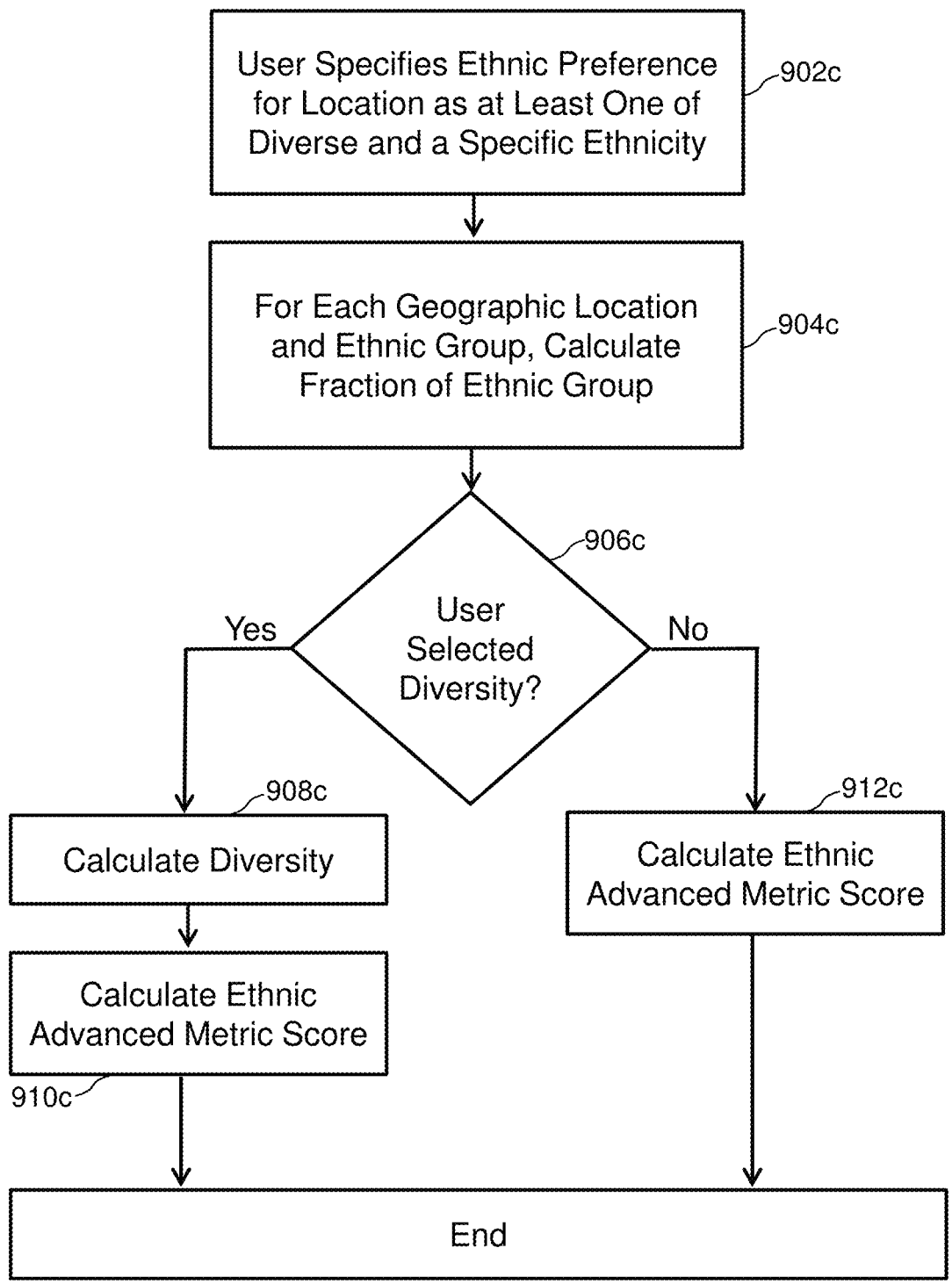
FIG. 9c shows calculating ethnic advanced metric score, in accordance with the various aspects and embodiments of the invention.

Referring to FIG. 9c, calculating ethnic advanced metric score is shown, in accordance with the various aspects and embodiments of the invention. At step 902c, the user specifies ethnic preference for a location as at least one of diverse and a specific ethnicity. For example, the user may specify they want to live in an ethnic diverse area. For another example, the user may specify they want to live in an area with a high percent of the population has a certain ancestry (e.g., European, Asian, African, etc.). For another example, the user may want to live in an area with a high percent of the population has a certain race (e.g., Caucasian, African American, Asian, Native American, etc.).

At step 904*c*, for each geographic location and ethnic category, calculate fraction of ethnic category for each location. According to one or more embodiments and aspects of the invention, N is the number of geographic locations and X is the number of ethnic categories. A matrix M is created with the size N by X. For each location, a row is created where each element is a fraction of the category total. For example, if a location has 6 Caucasian people, 5 African American people, 3 Asian people, and 2 Native American people then the location has 16 total people and row=[6/16, 5/16, 3/16, 2/16]=[0.38, 0.31, 0.19, 0.13].

At step 906*c* a determination is made if the user has selected diverse. If the user selected diverse, step 908 is performed. If the user did not select diverse, step 912*c* is performed.

At step 908*c*, diversity is calculated. According to one or more embodiments and aspects of the invention, an array Z is calculated for each location i such that $$Z_i = \sum_{k=1}^{X} \text{abs}(M[i,k] - 1/X)$$

wherein X is the number of ethnic categories and M is the matrix created in step 904*c*. The diversity array D is calculated for each location i such that D[i]=1 minus Z[i] divided by max(Z).

At step 910*c*, ethnic advanced metric score is calculated when diversity is selected. According to one or more embodiments and aspects of the invention, ethnic advanced metric is calculated at location i as 1-D[i]/max(D).

At step 912*c*, ethnic advanced metric score is calculated when a single ethnicity is selected. According to one or more embodiments and aspects of the invention, ethnic advanced metric score for ethnic category j is calculated at location i as M[i,j]−min(M[:,j]) divide by (max(M[:,j])−min(M[:,j])) where M[:,j] is the column at position j that includes all locations. According to one or more embodiments and aspects of the invention, multiple ethnic groups may be selected. For example, Caucasian and African American. According to one or more embodiments and aspects of the invention, each single race ethnic advanced metric score is calculated separately and the results are combined to calculate the final ethnic advanced metric score. For example, the Caucasian ethnic advanced metric score and African American ethnic advanced metric score are average to create the overall ethnic advanced metric score.

According to one or more embodiments and aspects of the invention, the algorithm or similar algorithm used to calculate ethnic advanced metric score may be used to calculate other advanced metric scores. For example, a worker's occupation can be specified as a single occupation (e.g., service) or as diverse. For another example, a worker's industry can be specified as a single industry (e.g., retail) or as diverse.

Figure 10:
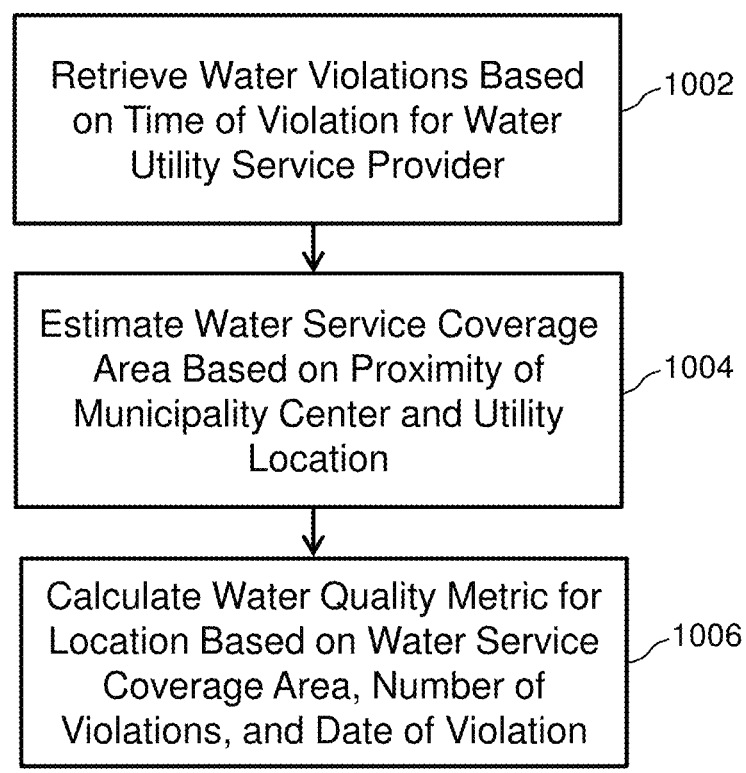
FIG. 10 shows calculating water violations advanced metric score, in accordance with the various aspects and embodiments of the invention.

Referring to FIG. 10, calculating water violations advanced metric score is shown, in accordance with the various aspects and embodiments of the invention. At step 1002, water violations are retrieved based on the time of violation for water utility service providers. At step 1004, water service coverage is estimated based on proximity of municipality center and utility location. At step 1006, the water quality metric is calculated for a location based on water service coverage area, number of violations, and date of violation. According to one or more embodiments and aspects of the invention, more recent water violations are given a higher weight compared to older violations. According to one or more embodiments and aspects of the invention, water violations may be classified as acute (i.e., affecting health of water drinker (e.g., lead in water)) and non-acute (i.e., not affecting health of water drinking (e.g., financial reporting problem of water utility service provider)). According to one or more embodiments and aspects of the invention, only acute water violations are considered and non-acute water violations are not considered. According to one or more embodiments and aspects of the invention, acute water violations are given a higher weight compared to non-acute water violations.

Figure 11:
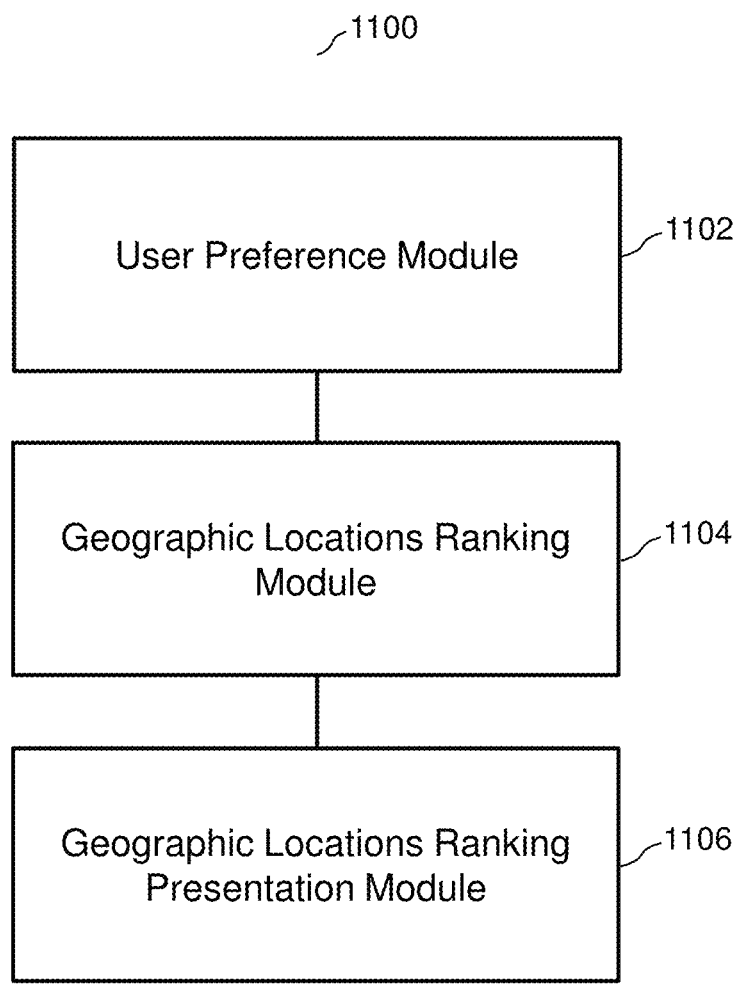
FIG. 11 shows a system for ranking geographic locations based on user preferences for various categories, in accordance with the various aspects and embodiments of the invention.

Referring to FIG. 11, a system 1100 for ranking geographic locations based on user preferences for various categories is shown, in accordance with the various aspects and embodiments of the invention. User preference module 1102 gathers user preference. Geographic locations ranking module 1104 calculates the rank of one or more locations. Geographic locations ranking presentation module 1106 displays the ranked locations to the user. System 1100 may perform the same or similar function as steps 102 to 110 of FIG. 1.

Figure 12:
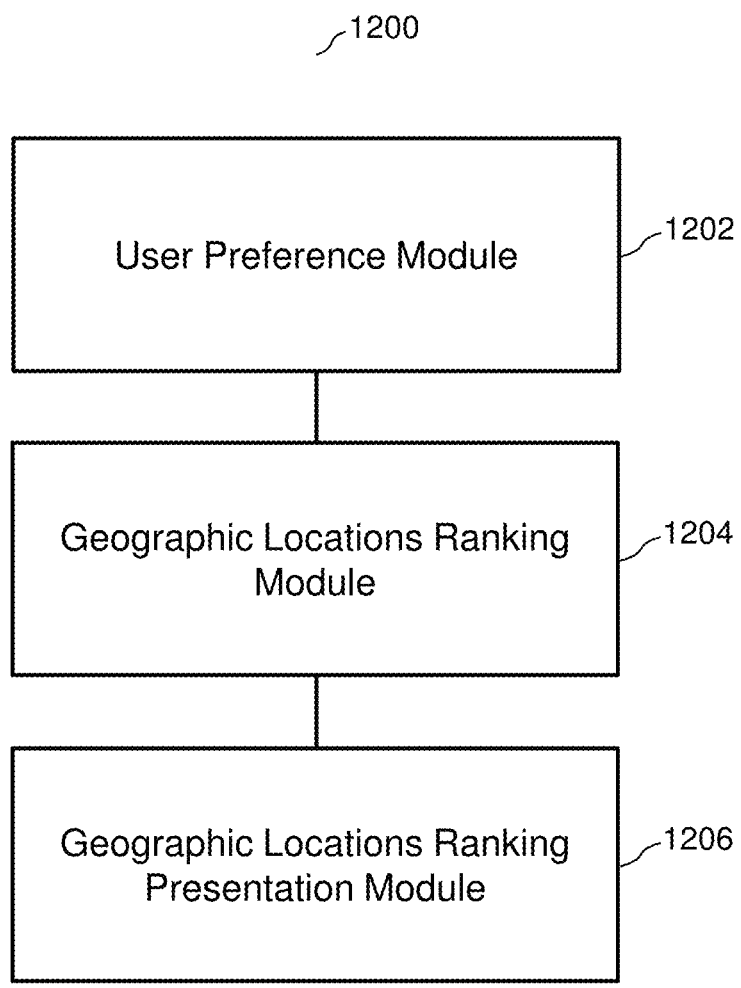
FIG. 12 shows a system for ranking geographic locations based on user preferences for various categories and user household details, in accordance with the various aspects and embodiments of the invention.

Referring to FIG. 12, a system 1200 for ranking geographic locations based on user preferences for various categories and user household details is shown, in accordance with the various aspects and embodiments of the invention. User preference module 1202 gathers user preference including household information. Geographic locations ranking module 1204 calculates the rank of one or more locations. Geographic locations ranking presentation module 1206 displays the ranked locations to the user. System 1200 may perform the same or similar function as steps 202 to 212 of FIG. 2.

Figure 13:
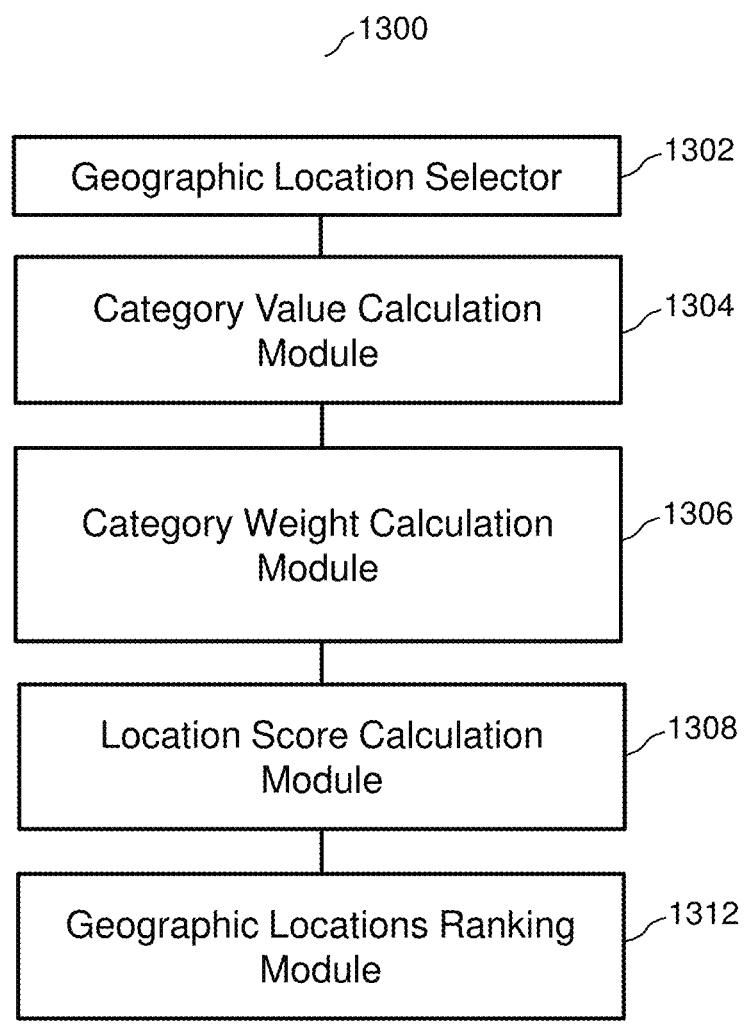
FIG. 13 shows a system for calculating geographic location score for various locations and ranking locations, in accordance with the various aspects and embodiments of the invention.

Referring to FIG. 13, a system 1300 for calculating geographic location score for various locations and ranking locations is shown, in accordance with the various aspects and embodiments of the invention. Geographic location selector 1302 selects a location to calculate a geographic location score. Category value calculation module 1304 calculates the category value for each geographic location category based on user specified metrics and/or default metric values. Category weight calculation module 1306 calculates the category weight for each geographic location category based on user specified user preference of relative importance for each category. Location score calculation module 1308 calculate the location score based on category value and category weight. Geographic locations ranking module 1312 calculates rankings of locations based on location score. System 1300 may perform the same or similar function as steps 302 to 312 of FIG. 3.

Figure 14:
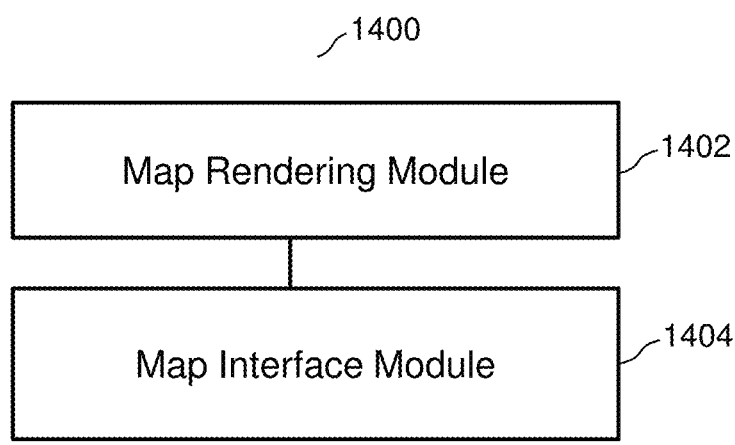
FIG. 14 shows a system for displaying various locations to a user and allowing user to further specify a location to obtain additional details, in accordance with the various aspects and embodiments of the invention.

Referring to FIG. 14, a system 1400 for displaying various locations to a user and allowing user to further specify a location to obtain additional details is shown, in accordance with the various aspects and embodiments of the invention. Map rendering module 1402 renders a map along with a count of locations within each geographic area of the map that satisfy the user's preference. Map interface module 1404 allows the user to select a geographic area to gain further insight into the selected geographic area. System 1400 may perform the same or similar function as steps 402 to 404 of FIG. 4.

Figure 15:
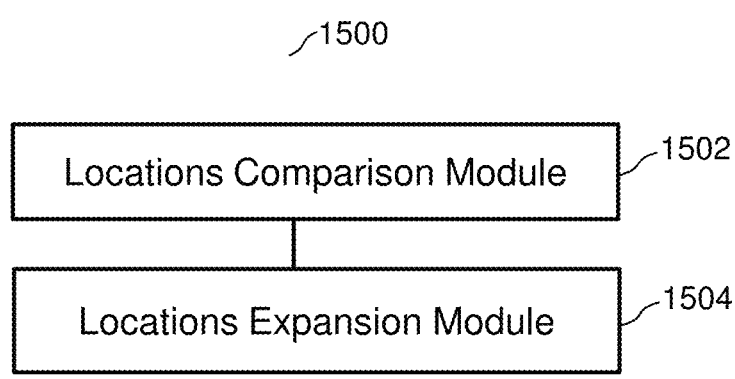
FIG. 15 shows a system for comparing two locations and allowing additional details of the locations to be shown, in accordance with the various aspects and embodiments of the invention.

Referring to FIG. 15, a system 1500 for comparing two locations and allowing additional details of the locations to be displayed is shown, in accordance with the various aspects and embodiments of the invention. Location comparison module 1502 compares two location for two geographic location categories. Location expansion module 1504 allows the geographic location category to be expanded to further display details of the geographic location category (e.g., advanced metrics). System 1500 may perform the same or similar function as steps 502 to 504 of FIG. 5.

Figure 16:
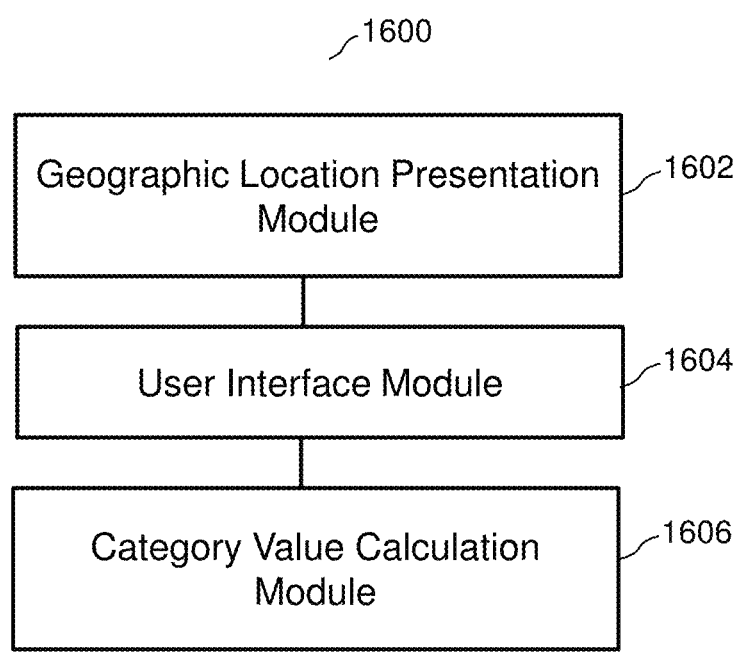
FIG. 16 shows a system for displaying advanced metrics to user and allowing user to further refine the advanced metrics, in accordance with the various aspects and embodiments of the invention.

Referring to FIG. 16, a system 1600 for displaying advanced metrics to user and allowing user to further refine the advanced metrics is shown, in accordance with the various aspects and embodiments of the invention. Geographic location presentation module 1602 presents one or more advanced metrics from a geographic location category to a user. User interface module 1604 allows the user to specify preference by adjusting metrics and removing any metrics that does not apply to user preference. Category value calculation module 1606 calculates a category value based on advanced metric values for a location. System 1600 may perform the same or similar function as steps 602 to 606 of FIG. 6.

Figure 17:
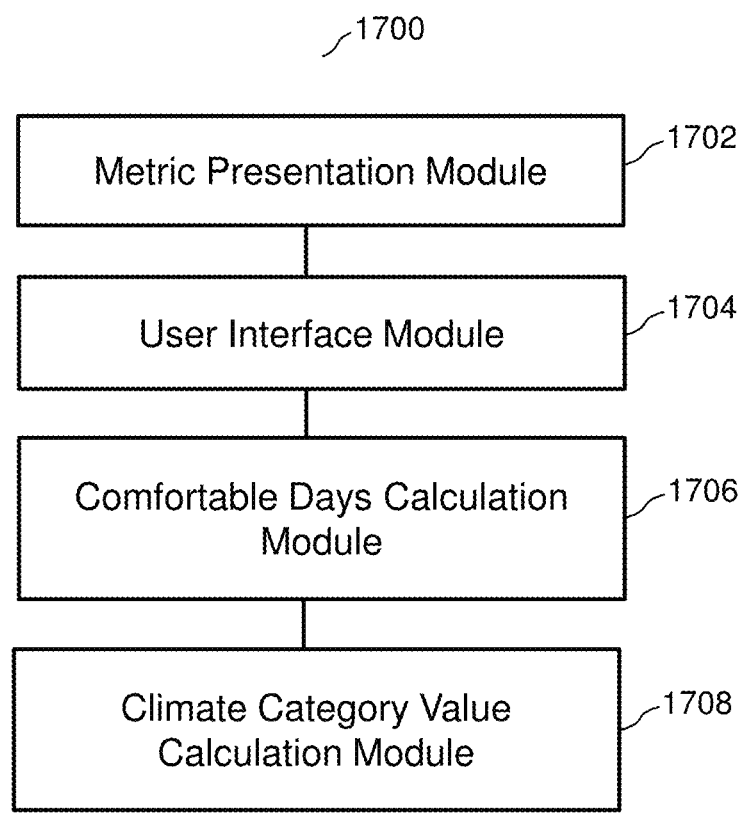
FIG. 17 shows a system for calculating climate category score, in accordance with the various aspects and embodiments of the invention.

Referring to FIG. 17, a system 1700 for calculating climate category score is shown, in accordance with the various aspects and embodiments of the invention. Metric presentation module 1702 presents one or more metrics from climate category to a user. User interface module 1704 allows user to specify climate preference by adjusting metrics and removing any metric that does not apply to the user preference. Comfortable days calculation module 1706 calculates the number of days per year the user will be comfortable based on advanced metrics from a location. Climate category value calculation module 1708 calculates climate category value based on the number of days per year the user will be comfortable. System 1700 may perform the same or similar function as steps 702 to 708 of FIG. 7.

Figure 18:
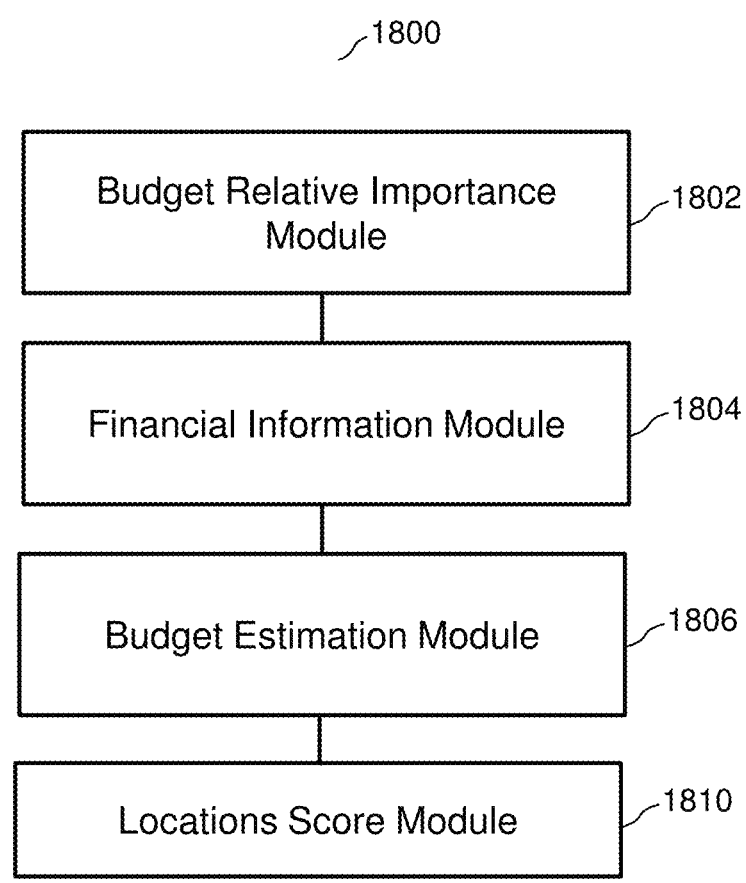
FIG. 18 shows a system for calculating the budget category score, in accordance with the various aspects and embodiments of the invention.

Referring to FIG. 18, a system 1800 for calculating the budget category score is shown, in accordance with the various aspects and embodiments of the invention. Budget relative importance module 1802 allows user to specify relative importance of saving money and paying for improved lifestyle. Financial information module 1804 obtains and/or estimates the user's financial information. Budget estimation module 1806 estimates the budget for one or more geographic locations using user financial information cost to live at location. Locations score module 1810 calculates the budget category score for each geographic location based on the user specified relative importance of saving money and paying for improved lifestyle, obtained and/or estimated user financial information, and estimated budget. System 1800 may perform the same or similar function as steps 802 to 808 of FIG. 8.

Figure 19A:
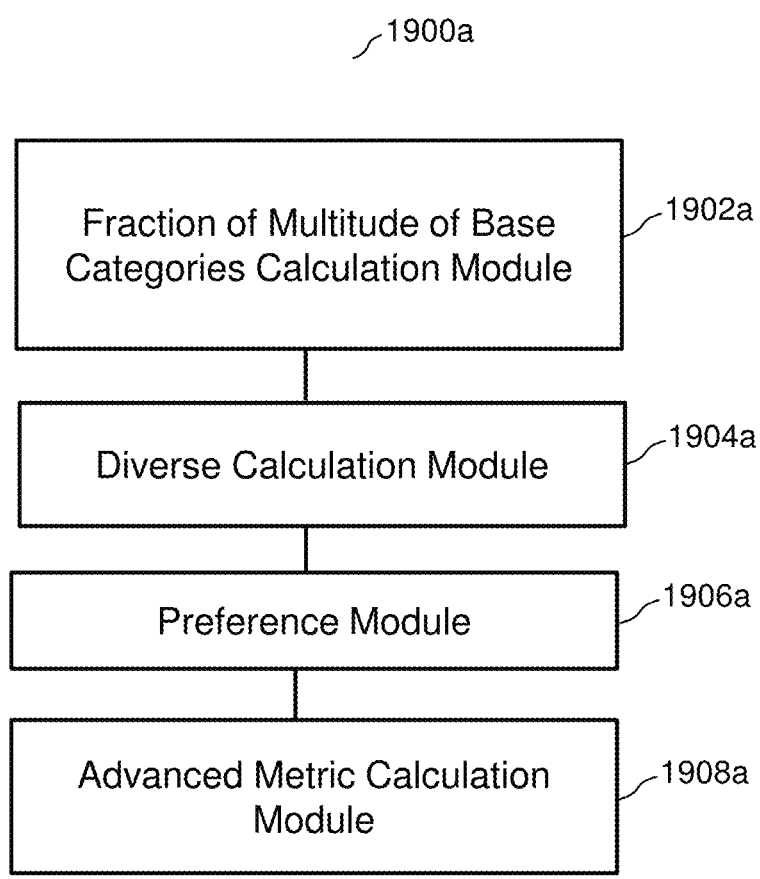
FIG. 19a shows a system for calculating advanced metric score, in accordance with the various aspects and embodiments of the invention.

Referring to FIG. 19*a*, a system 1900*a* for calculating advanced metric score is shown, in accordance with the various aspects and embodiments of the invention. Fraction of multitude of base categories calculation module 1902*a* calculates the fraction of categories for each location. Diverse calculation module 1904*a* calculates the diversity of each location. Preference module 1906*a* allows user to specify the user's preference. Advanced metric calculation module 1908*a* calculates the advanced metric score based on fraction of multitude of base categories, diversity calculation, and user's preference. System 1900*a* may perform the same or similar function as steps 902*a*-912*a* of FIG. 9*a*.

Figure 19B:
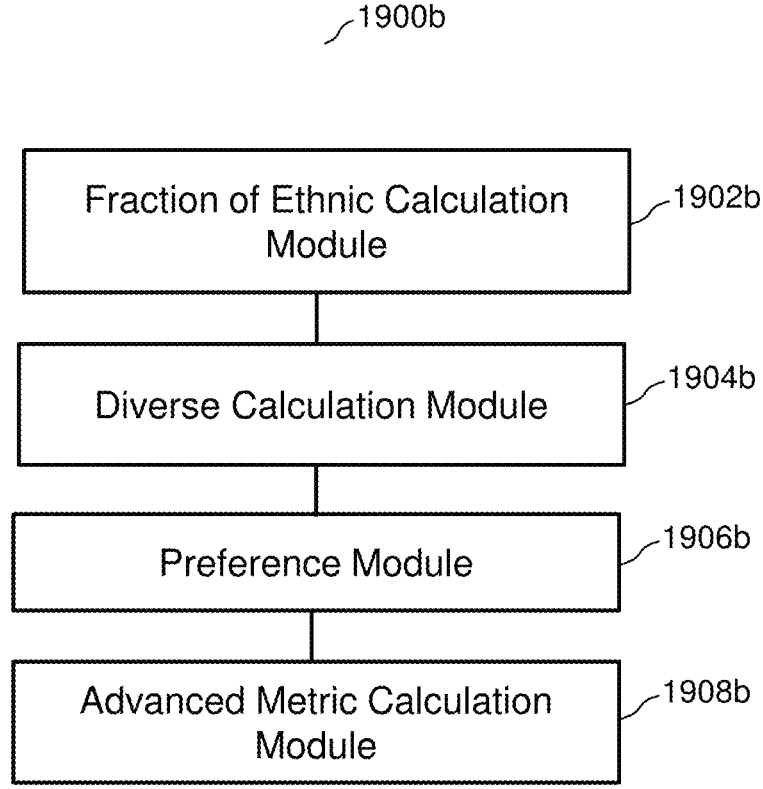
FIG. 19b shows a system for calculating ethnic advanced metric score, in accordance with the various aspects and embodiments of the invention.

Referring to FIG. 19*b*, a system 1900*b* for calculating ethnic advanced metric score is shown, in accordance with the various aspects and embodiments of the invention. Fraction of ethnic calculation module 1902*b* calculates the fraction of categories for each location. Diverse calculation module 1904*b* calculates the diversity of each location. Preference module 1906*b* allows user to specify the user's preference. Advanced metric calculation module 1908*b* calculates the diverse advanced metric score based on fraction of ethnic categories, diversity calculation, and user's preference. System 1900*b* may perform the same or similar function as steps 902*b*-912*b* of FIG. 9*b*.

Figure 19C:
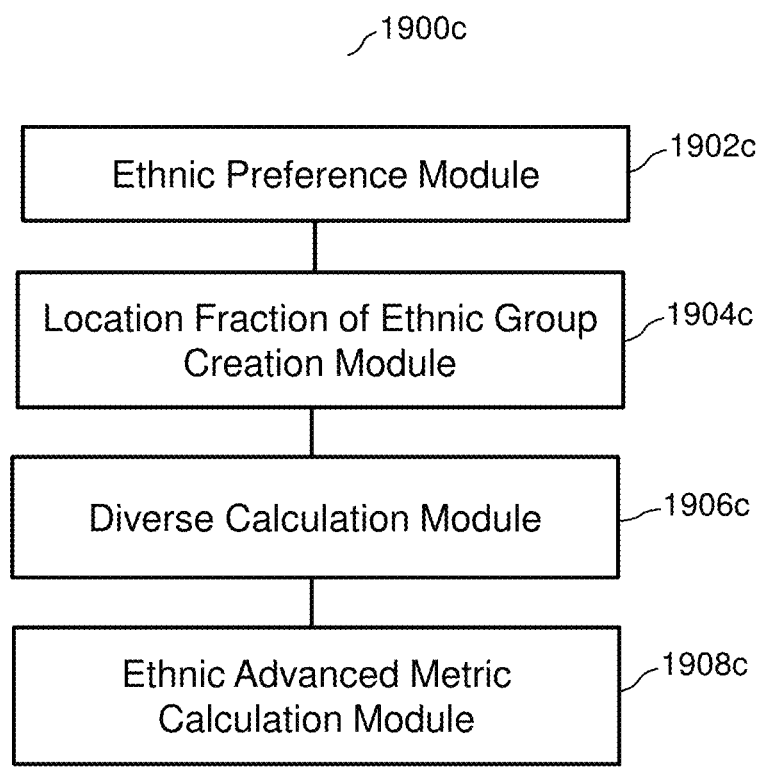
FIG. 19c shows a system for calculating ethnic metric score, in accordance with the various aspects and embodiments of the invention.

Referring to FIG. 19*c*, a system 1900*c* for calculating ethnic advanced metric score is shown, in accordance with the various aspects and embodiments of the invention. Ethnic preference module 1902*c* allows user to specify the user's ethnic preference. Location fraction of ethnic group creation module 1904*c* calculates fraction of ethnic group for each location. Diverse calculation module 1906*c* calculate the diverse metric value for each location. Ethnic advanced metric calculation module 1908*c* calculates the ethnic advanced metric. System 1900*c* may perform the same or similar function as steps 902*c* to 912*c* of FIG. 9.

Figure 20:
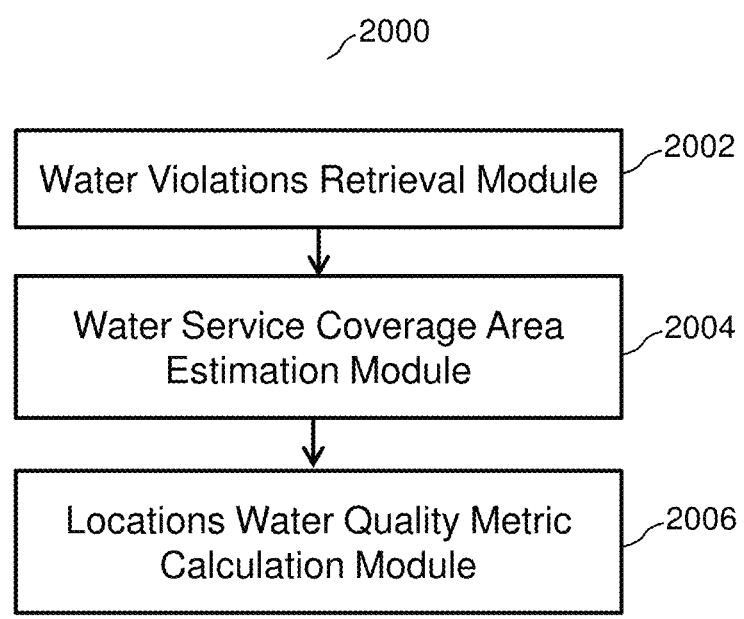
FIG. 20 shows a system for calculating water quality advanced metric score, in accordance with the various aspects and embodiments of the invention.

Referring to FIG. 20, a system 2000 for calculating water quality metric is shown, in accordance with the various aspects and embodiments of the invention. Water violations retrieval module 2002 retrieve water violations based on time and type of violation for water utility service providers. Water service coverage area estimation module 2004 estimates water service coverage area based on proximity of municipality center and utility location. Locations water quality metric calculation module 2006 calculates water quality metric for location based on water service coverage area, number of violations, and date of violation. System 2000 may perform the same or similar function as steps 1002 to 1006 of FIG. 10.

Figure 21:
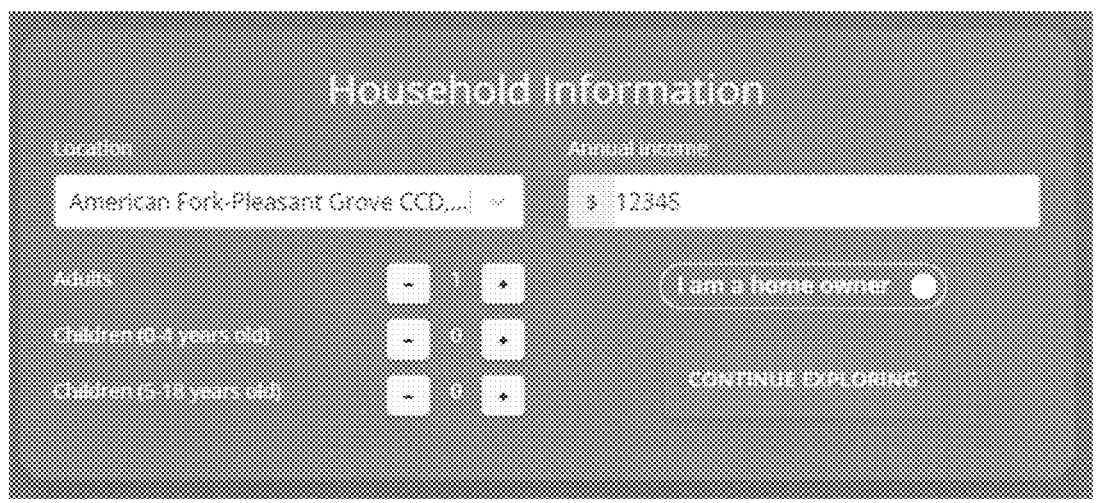
FIG. 21 shows a Graphic User Interface (GUI) for the user to input household information, in accordance with the various aspects and embodiments of the invention.

Referring to FIG. 21, a GUI for the user to input household information is shown, in accordance with the various aspects and embodiments of the invention. According to one or more embodiments and aspects of the invention, FIG. 21 may implement the same or similar function to step 202. According to one or more embodiments and aspects of the invention, after the household information is input, the user is presented with one or more geographic location categories to specify the user preference of relative importance for each category. According to one or more embodiments and aspects of the invention, a list of ranked geographic locations may be presented to the user.

Figure 22:
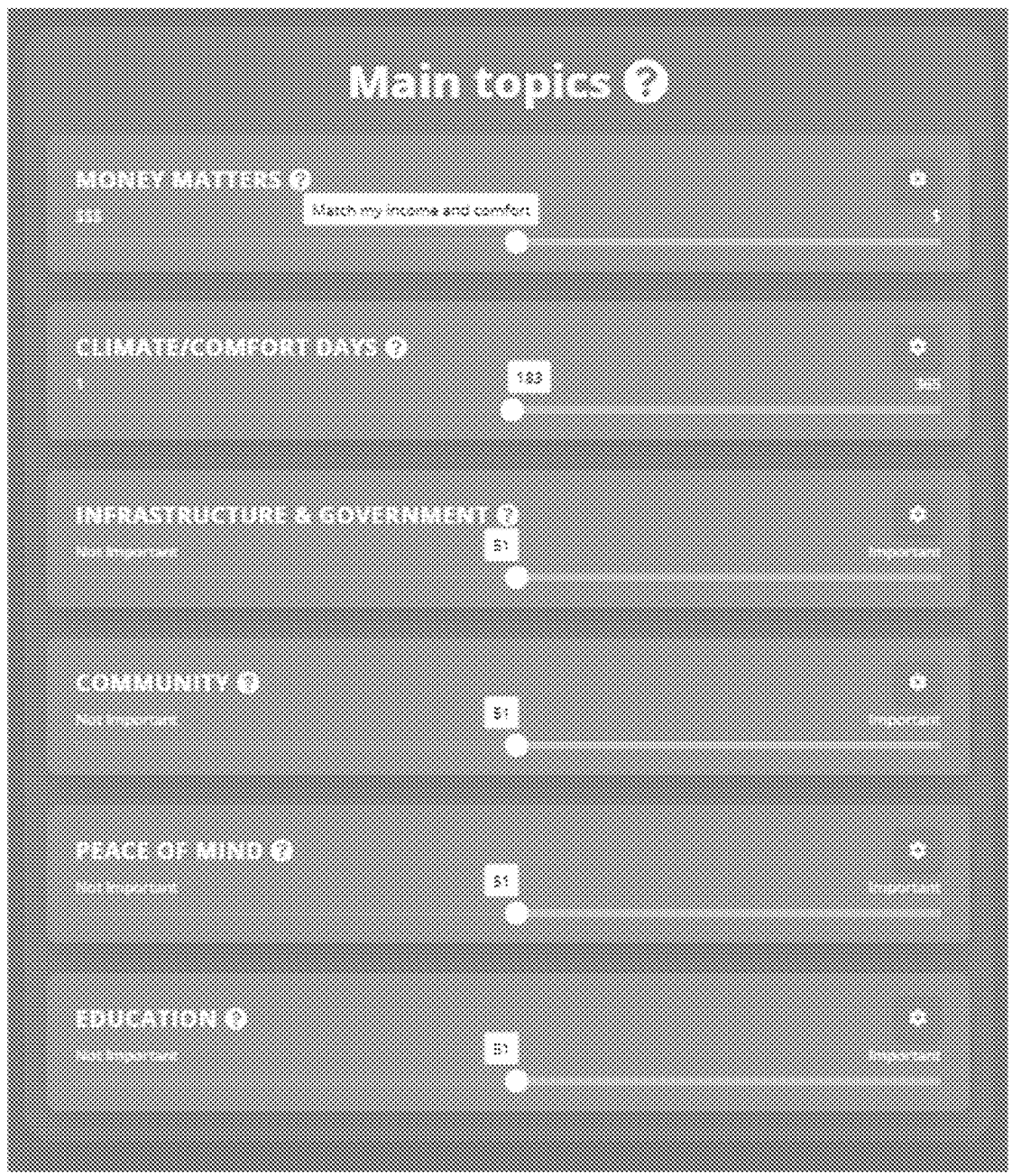
FIG. 22 shows a GUI for the user to select relative importance of a group of geographic location categories, in accordance with the various aspects and embodiments of the invention.

Referring to FIG. 22, a GUI for the user to select the relative importance of a group of geographic location categories is shown, in accordance with the various aspects and embodiments of the invention. According to one or more embodiments and aspects of the invention, the GUI includes the following geographic location categories: budget (shown as money matters in FIG. 22), local infrastructure and government, demographics (shown as community in FIG. 22), risk (shown as peace of mind in FIG. 22), education, and climate.

Figure 23A:
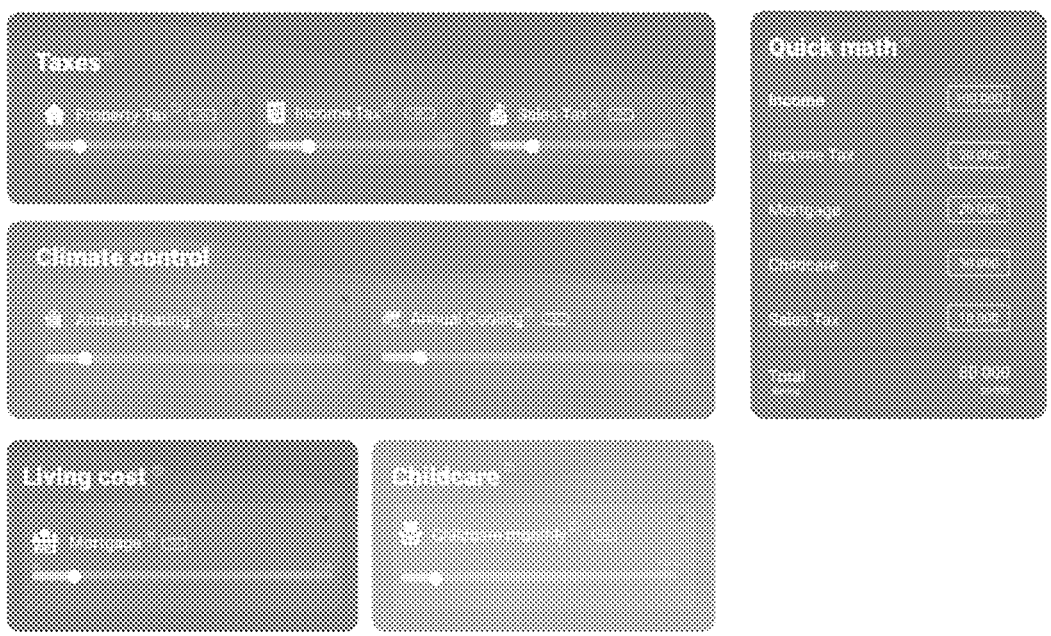
FIG. 23a shows a GUI for the user to specify advanced category metrics for budget category, in accordance with the various aspects and embodiments of the invention.

Referring to FIG. 23*a*, a GUI for the user to specify advanced category metrics for the budget category is shown, in accordance with the various aspects and embodiments of the invention. According to one or more embodiments and aspects of the invention, the advanced category metrics may include one or more of the metrics listed in FIG. 23*a* and advanced category metrics from step 602.

Figure 23B:
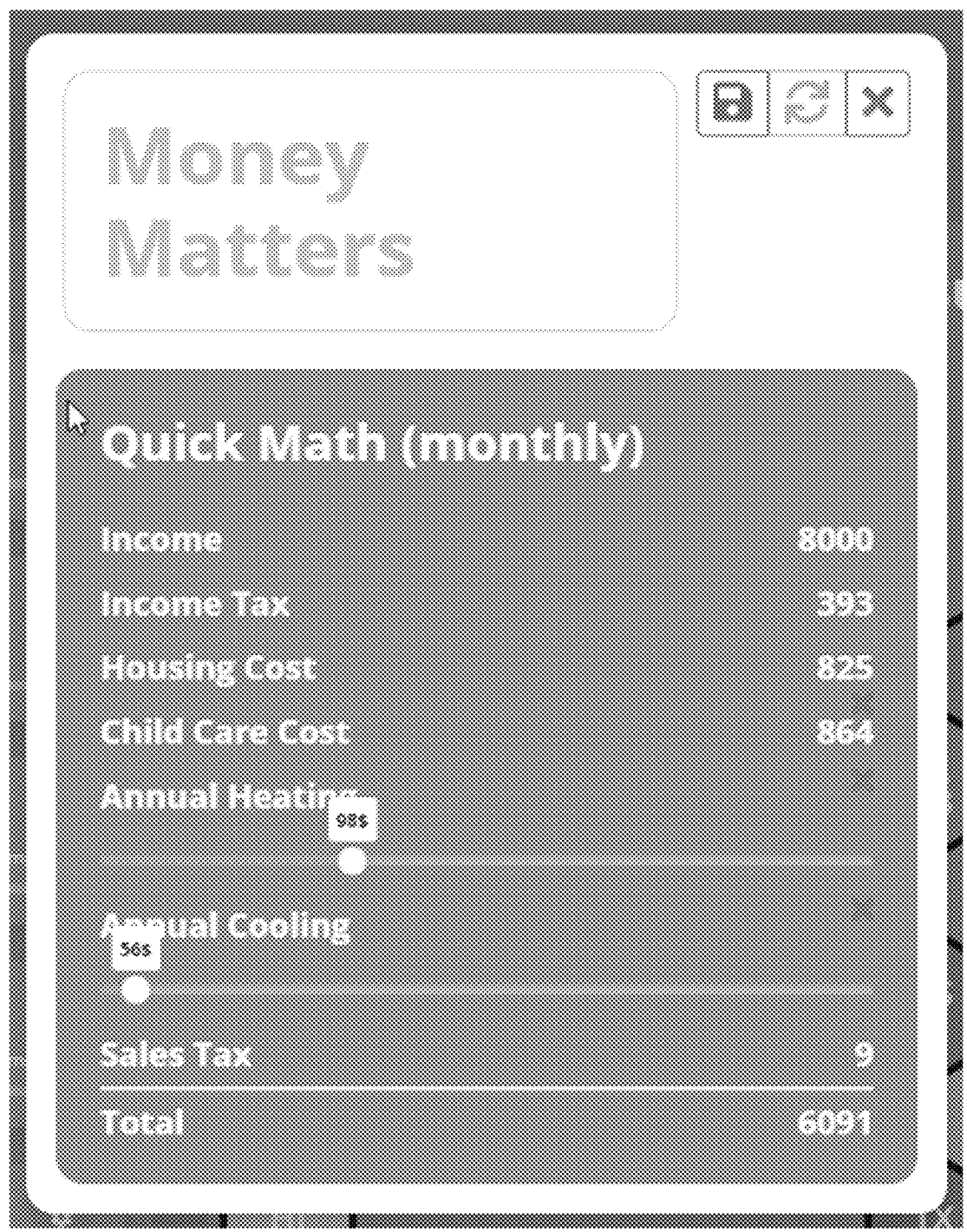
FIG. 23b shows a GUI for the user to specify advanced category metrics for budget category, in accordance with the various aspects and embodiments of the invention.

Referring to FIG. 23*b*, a GUI for the user to specify advanced category metrics for the budget category is shown, in accordance with the various aspects and embodiments of the invention. According to one or more embodiments and aspects of the invention, the advanced category metrics may include one or more of the metrics listed in FIG. 23*b* and advanced category metrics from step 602.

Figure 24:
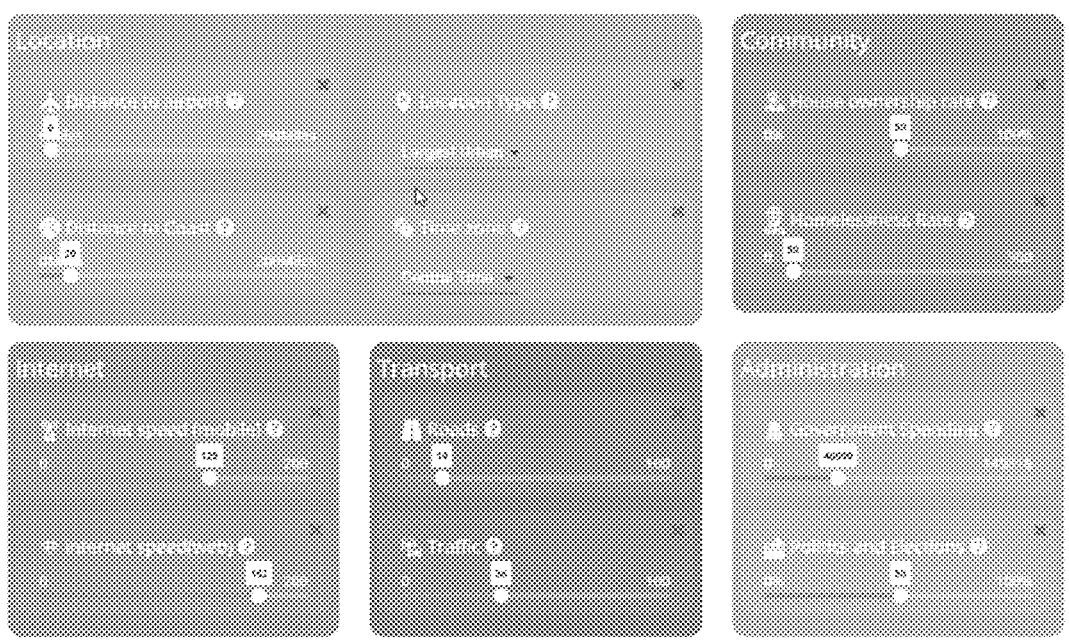
FIG. 24 shows a GUI for the user to specify advanced category metrics for local infrastructure and government category, in accordance with the various aspects and embodiments of the invention.

Referring to FIG. 24, a GUI for the user to specify advanced category metrics for the local infrastructure and government category is shown, in accordance with the various aspects and embodiments of the invention. According to one or more embodiments and aspects of the invention, the advanced category metrics may include one or more of the metrics listed in FIG. 24 and advanced category metrics from step 602.

Figure 25:
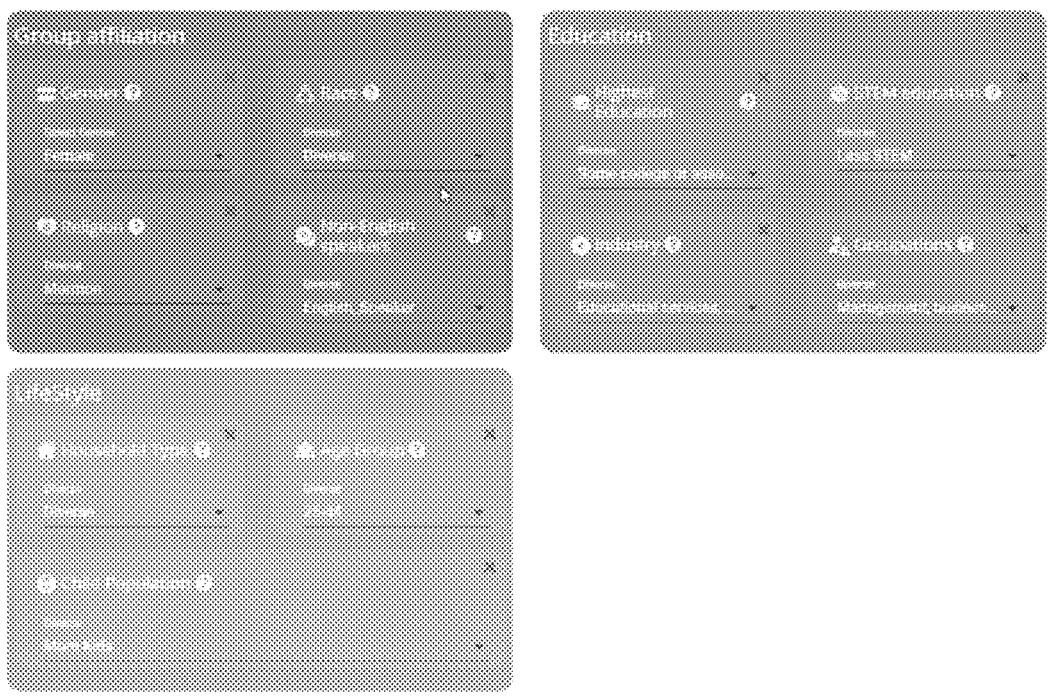
FIG. 25 shows a GUI for the user to specify advanced category metrics for demographic category, in accordance with the various aspects and embodiments of the invention.

Referring to FIG. 25, a GUI for the user to specify advanced category metrics for the demographic category is shown, in accordance with the various aspects and embodiments of the invention. According to one or more embodiments and aspects of the invention, the advanced category metrics may include one or more of the metrics listed in FIG. 25 and advanced category metrics from step 602.

Figure 26:
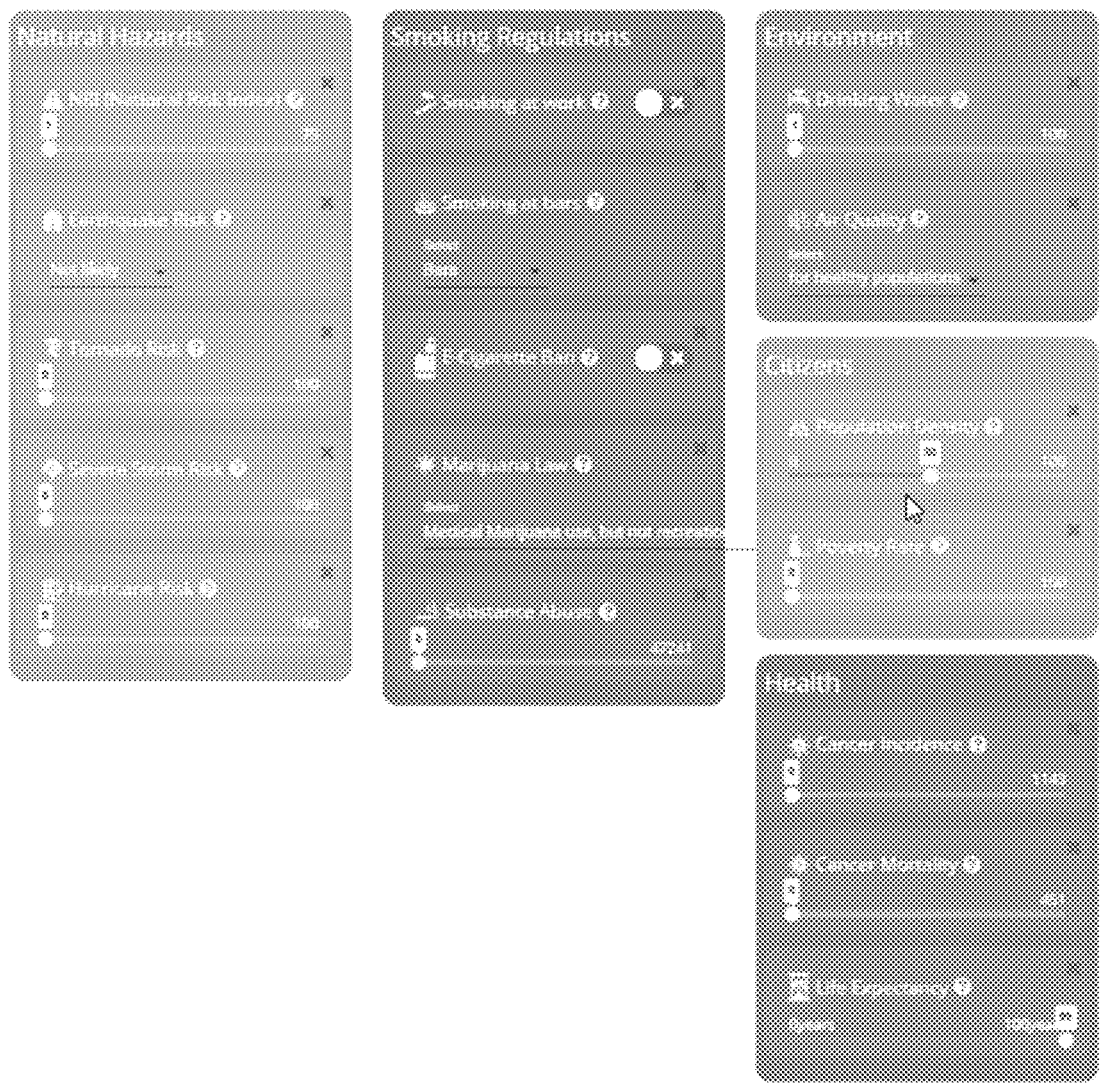
FIG. 26 shows a GUI for the user to specify advanced category metrics for risk category, in accordance with the various aspects and embodiments of the invention.

Referring to FIG. 26, a GUI for the user to specify advanced category metrics for the risk category is shown, in accordance with the various aspects and embodiments of the invention. According to one or more embodiments and aspects of the invention, the advanced category metrics may include one or more of the metrics listed in FIG. 26 and advanced category metrics from step 602.

Figure 27:
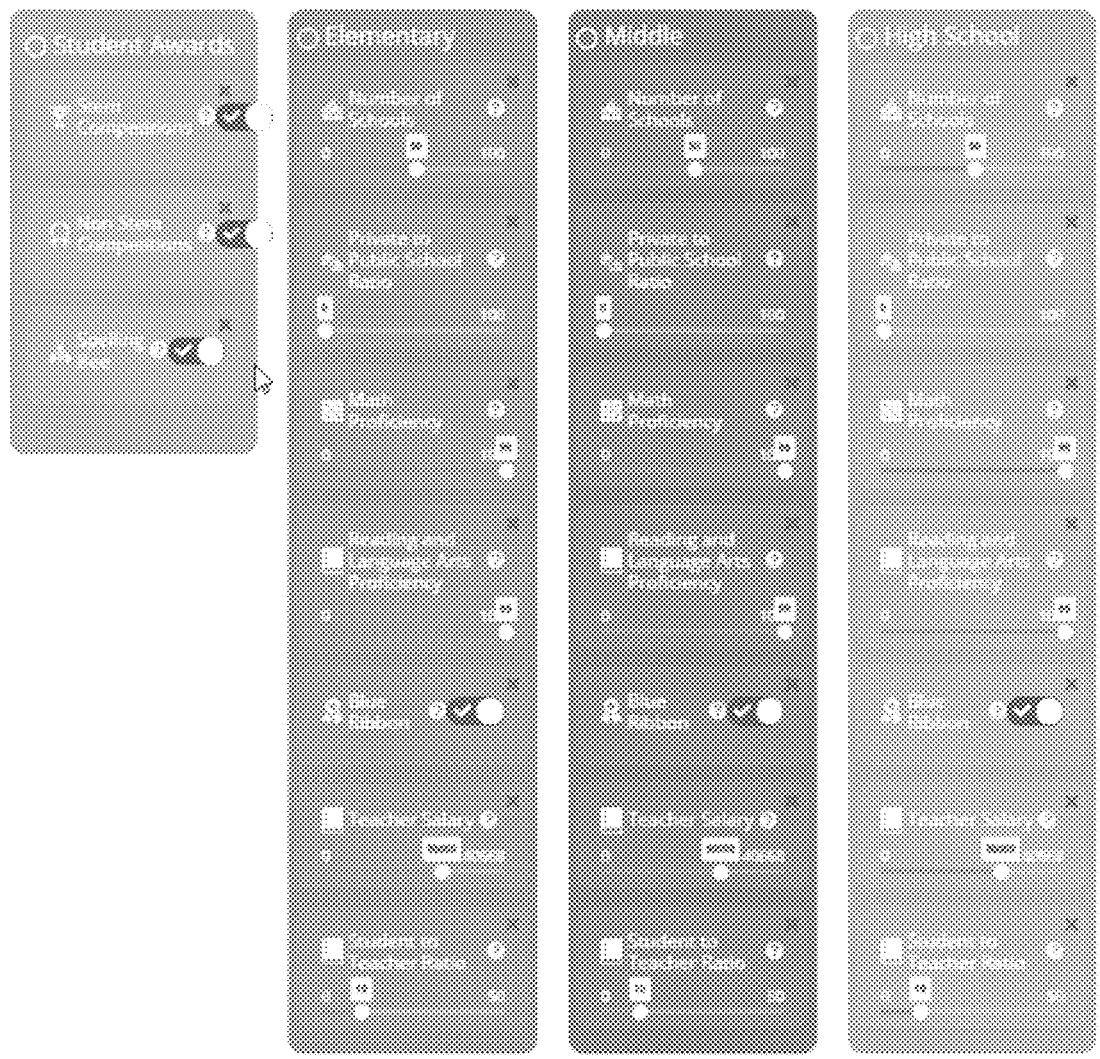
FIG. 27 shows a GUI for the user to specify advanced category metrics for education category, in accordance with the various aspects and embodiments of the invention.

Referring to FIG. 27, a GUI for the user to specify advanced category metrics for the education category is shown, in accordance with the various aspects and embodiments of the invention. According to one or more embodiments and aspects of the invention, the advanced category metrics may include one or more of the metrics listed in FIG. 27 and advanced category metrics from step 602.

Figure 28:
FIG. 28 shows a GUI for the user to specify advanced category metrics for climate category, in accordance with the various aspects and embodiments of the invention.

Referring to FIG. 28, a GUI for the user to specify advanced category metrics for the climate category is shown, in accordance with the various aspects and embodiments of the invention. According to one or more embodiments and aspects of the invention, the advanced category metrics may include one or more of the metrics listed in FIG. 28 and advanced category metrics from step 602.

Figure 29:
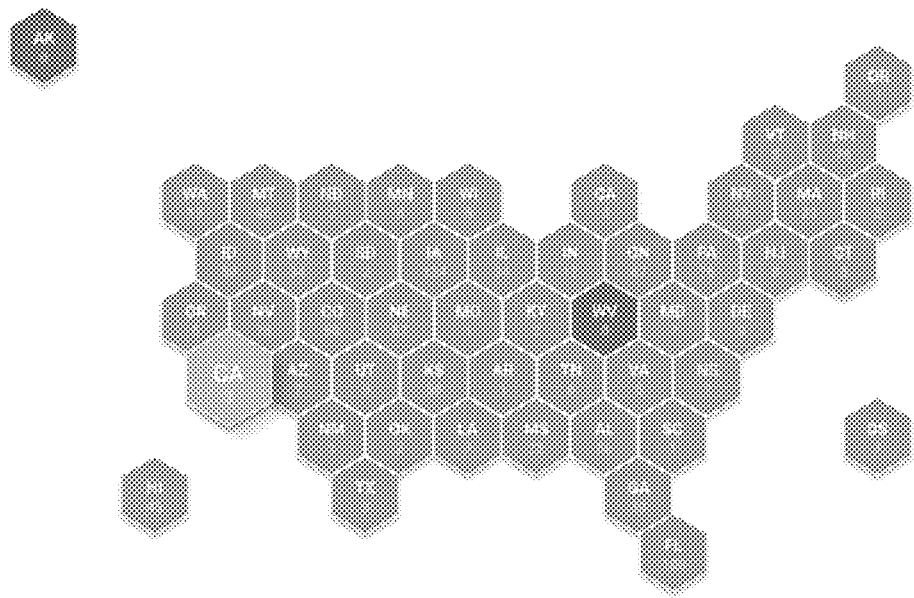
FIG. 29 shows a map where separate regions show the count of locations within each region that meet the user's preference, in accordance with the various aspects and embodiments of the invention.

Referring to FIG. 29, a map with region displaying the count of locations within each region that meet the user's preference is shown, in accordance with the various aspects and embodiments of the invention. According to one or more embodiments and aspects of the invention, the map of FIG. 29 is the same or similar to the map of step 403.

Figure 30:
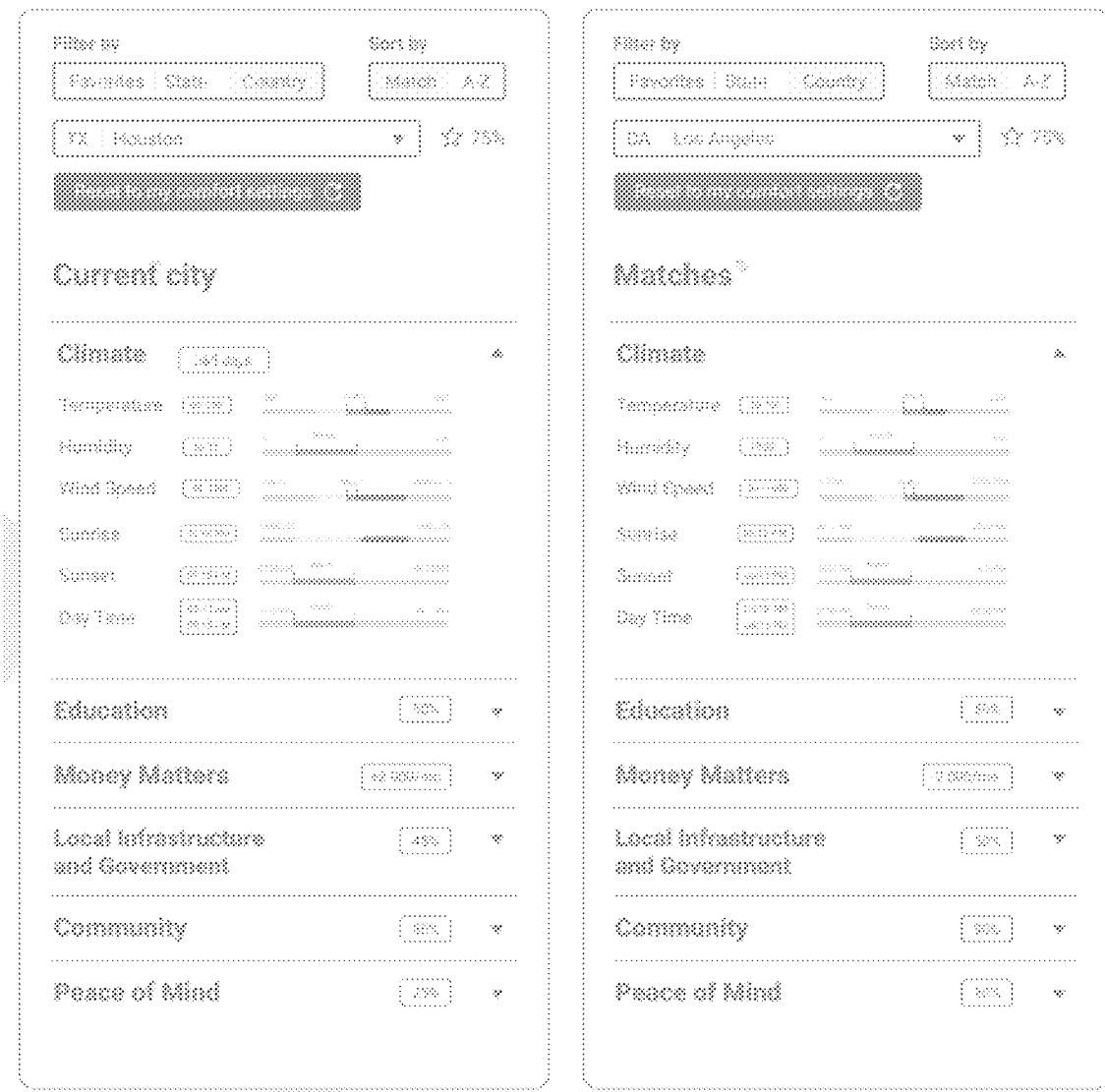
FIG. 30 shows a side-by-side comparison of two geographic locations, in accordance with the various aspects and embodiments of the invention.

Referring to FIG. 30, a side-by-side comparison of two geographic locations is shown, in accordance with the various aspects and embodiments of the invention. According to one or more embodiments and aspects of the invention, the side-by-side comparison is the same or similar to steps 502 and 503.

According to one or more embodiments and aspects of the invention, various calculations may be done in advance of the users search and the results may be stored. When performing user searches, the results may be retrieved. According to one or more embodiments and aspects of the invention, search results may be cached to improve the speed that results are given to the user. According to one or more embodiments and aspects of the invention, though it is taught the invention is a user interactively using a GUI, the present invention may interact with another software package (e.g., via an application programing interface (API).

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code having instructions according to various examples and aspects of the invention.

Certain examples have been described herein and it will be noted that different combinations of different components from different examples may be possible. Salient features are presented to better explain examples; however, it is clear that certain features may be added, modified, and/or omitted without modifying the functional aspects of these examples as described.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

In accordance with the various aspects of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods. The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories or memory. Thus, in certain embodiments that are in accordance with any aspect of the invention, computer readable program code (or code) is encoded in a non-transitory computer readable medium of the computing device. As outlined herein, a processor or a module, in turn, executes the computer readable program code to create or amend an existing computer-aided design using a tool. The term "module" as used herein may refer to one or more circuits, components, registers, processors, software subroutines, or any combination thereof. In accordance with some aspects and embodiments of the invention, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements that, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Reference throughout this specification to "one embodiment," "an embodiment," or "in accordance with some aspects" and similar language means that a particular feature, structure, or characteristic described in connection with the various aspects and embodiments are included in at least one embodiment of the invention. Thus, appearances of the phrases "in accordance with an aspect," "in accordance with one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Therefore, the scope of the invention is not intended to be limited to the various aspects and embodiments discussed and described herein. Rather, the scope and spirit of the invention is embodied by the appended claims.

What is claimed is:

1. A method for ranking geographic locations according to a user preference of a user, the method comprising:
    specifying, by the user, relative importance, based on the user preference, for each of one or more geographic location categories;
    specifying, by the user, advanced category specific metrics for each of the one or more geographic location categories;
    calculating a geographic location score for each of the one or more geographic locations based at least partially on at least one of: the relative importance, the advanced category specific metrics specified by the user, and default advanced category specific metrics, wherein calculating geographic location score includes:
        calculating a category value for each of the geographic location categories based at least partially on at least one of: the advanced category specific metrics and the default advanced category specific metrics;
        calculating a category weight based at least partially on the relative importance of each of the one or more geographic location categories;
        calculating a category score for each of the one or more geographic location categories based at least partially on, respectively, the category value and the category weight; and
        calculating the geographic location score based at least partially on the category score;
    ranking each of the one or more geographic locations based at least partially on the geographic location score; and
    generating and displaying, to the user, a graphical user interface that presents interactive objects including at least one of the ranked geographic locations and a preference score related to how close each of the geographic locations is to the user preference, wherein each of the at least one of the ranked geographic locations being displayed in one or more regions of the graphical user interface is based at least upon the respective ranking and the user preference, wherein the geographic location categories include a budget geographic location category and calculating the category score for the budget geographic location category includes:
- specifying, by the user, relative importance of saving money and paying for improved lifestyle;
- obtaining or estimating user financial information;
- estimating a budget for one or more geographic locations based at least partially on at least one of user financial information and cost to live at a location; and
- calculating a budget category score for each geographic location based at least partially on the specified relative importance of saving money and paying for improving lifestyle, the obtained or estimated user financial information, and the budget.

2. The method of claim 1, further comprising specifying, by the user, one or more household details, wherein calculating geographic location score includes one or more household details.

3. The method of claim 1, wherein calculating the category value includes calculating category value for each of the geographic location category based at least partially on at least two of: the user preferences of relative importance, the advanced category specific metrics specified by the user, and the default advanced category specific metrics.

4. The method of claim 1, wherein the geographic location categories include a climate category geographic location category and calculating a climate category score for the climate geographic location category includes:
- specifying, by the user, advanced climate category specific metrics for climate that the user finds comfortable;
- determining, for each of the geographic locations, a number of days per year that the user will be comfortable based at least partially on the advanced climate category specific metrics; and
- calculating the climate category score for each of the geographic locations based at least partially on the number of days per year that the user finds comfortable.

5. The method of claim 1, wherein the budget is determined as user income minus taxes minus expenses and calculating h budget category score includes:
- adjusting at least one slider, by the user, to specify relative importance of saving money and paying for improving lifestyle;
- creating one or more interpolation functions to map, including:
  - slider minimum to largest budget of all the locations;
  - slider mid-point maps to the budget of the user's present location; and
  - slider maximum maps to the smallest budget of all the locations; and
- calculating the budget category score for each of the geographic locations based at least partially on the one or more interpolation functions.

6. The method of claim 1, wherein the budget is determined as user income minus taxes minus expenses and calculating h budget category score includes:
- adjusting a slider, by the user, to specify relative importance of saving money and paying for improving lifestyle;
- calculating an ideal budget as a minimum budget from all locations plus a slider value times (maximum budget from all locations minus minimum budget from all locations) wherein the slider value is a percent between 0% and 100%; and
- calculating the budget category score for each geographic location as 1 minus absolute((ideal budget minus budget for location) divided by (maximum budget for all locations minus minimum budget for all locations)) wherein absolute is a function that returns the absolute value of the operands.

7. The method of claim 1, wherein the advanced category specific metrics include a diversity advanced category specific metric and the advanced category specific metric is set to one of diversity and a multitude of base categories and calculating h geographic location score includes:
- calculating fraction of multitude of base categories for each geographic location;
- calculating diversity score based at least partially on fraction of base categories when diversity advanced category specific metric is diverse;
- calculating diversity advanced category specific metric score based at least partially on diversity score when diversity advanced category specific metric is diverse; and
- calculating diversity advanced category specific metric score based at least partially on the fraction of multitude of base categories when diversity advanced category specific metric is one of the multitude of base categories.

8. The method of claim 7, wherein the multitude of base categories is one of the following: list of ethnicity, list of occupations, and list of industries.

9. A system including a processor and memory, wherein the memory stores code that is executed by the processor to cause the system to:
- specify, by a user, relative importance, based on a user preference, for each of one or more geographic location categories;
- specify, by the user, advanced category specific metrics for each of the one or more geographic location categories;
- calculate a geographic location score for each of the one or more geographic locations based at least partially on at least one of: the relative importance, the advanced category specific metrics specified by the user, and default advanced category specific metrics, wherein to calculate the geographic location score the processor causes the system to:
  - calculate a category value for each of the geographic location categories based at least partially on at least one of: the advanced category specific metrics and the default advanced category specific metrics:
  - calculate a category weight based at least partially on the relative importance of each of the one or more geographic location categories;
  - calculate a category score for each of the one or more geographic location categories based at least partially on, respectively, the category value and the category weight; and
  - calculate the geographic location score based at least partially on the category score;
- rank each of the one or more geographic locations based at least partially on the geographic location score; and
- generate and display, to the user, a graphical user interface that presents interactive objects including at least one of the ranked geographic locations and a preference score related to how close each of the geographic locations is to the user preference, wherein each of the at least one of the ranked geographic locations being displayed in one or more regions of the graphical user interface is based at least upon the respective ranking and the user preference,
wherein the geographic location categories include a budget geographic location category and to calculate the category score for the budget geographic location category the processor causes the system to:
specify, by the user, relative importance of saving money and paying for improved lifestyle;
obtain or estimating user financial information;
estimate a budget for one or more geographic locations based at least partially on at least one of user financial information and cost to live at a location; and
calculate a budget category score for each geographic location based at least partially on the specified relative importance of saving money and paying for improving lifestyle, the obtained or estimated user financial information, and the budget.

10. The system of claim 9 further caused to receive, by the user specifying, one or more household details, wherein the geographic location score includes one or more household details.

11. The system of claim 9 further caused to calculate a category value for each geographic location category based at least partially on: the at least two of user preferences of relative importance, the advanced category specific metrics specified by the user, and the default advanced category specific metrics.

12. The system of claim 9, wherein the geographic location categories include a climate category geographic location category, and wherein to calculate the category score for the climate geographic location category the system is further caused to:
specify, by the user, advanced climate category specific metrics for climate that the user finds comfortable;
determine for each geographic location the number of days per year the user will be comfortable based at least partially on the advanced climate category specific metrics; and
calculate climate category score for each geographic location based at least partially on the number of days per year the user will be comfortable.

13. The system of claim 9, wherein the budget is determined as user income minus taxes minus expenses and to calculate the budget category score the system is caused to:
receive, from the user adjusting a slider to specify, relative importance of saving money and paying for improving lifestyle;
create one or more interpolation functions to map, including:
slider minimum to largest budget of all the locations;
slider mid-point maps to the budget of the user's present location; and
slider maximum maps to the smallest budget of all the locations; and
calculate a budget category score for each geographic location based at least partially on the one or more interpolation functions.

14. The system of claim 9, wherein budget is determined as user income minus taxes minus expenses, and to calculate the budget category score the system is caused to:
receive, from the user adjusting a slider to specify, relative importance of saving money and paying for improving lifestyle;
calculate ideal budget as minimum budget from all locations plus slider value times (maximum budget from all locations minus minimum budget from all locations) wherein the slider value is a percent between 0% and 100%; and
calculate budget category score for each geographic location as 1 minus absolute((ideal budget minus budget for location) divided by (maximum budget for all locations minus minimum budget for all locations)) wherein absolute is a function that returns the absolute value of the operands.

15. The system of claim 9, wherein the advanced category specific metrics include a diversity advanced category specific metric, wherein the advanced category specific metric is set to one of diversity and a multitude of base categories and to calculate the geographic location score the system is further caused to:
calculate fraction of multitude of base categories for each geographic location;
calculate diversity score based at least partially on fraction of base categories when diversity advanced category specific metric is diverse;
calculate diversity advanced category specific metric score based at least partially on diversity score when diversity advanced category specific metric is diverse; and
calculate diversity advanced category specific metric score based at least partially on the fraction of multitude of base categories when diversity advanced category specific metric is one of the multitude of base categories.

16. The system of claim 15, wherein the multitude of base categories is one of the following: list of ethnicity, list of occupations, and list of industries.

17. A non-transitory computer-readable storage medium storing instructions which, when executed by at least one processor, cause the at least one processor to:
receive, from a user specified relative importance, based on a user preference, for each of one or more geographic location categories;
receive advanced category specific metrics for each of the one or more geographic location categories;
calculate a geographic location score for each of the one or more geographic locations based at least partially on at least one of: the relative importance, the advanced category specific metrics specified by the user, and default advanced category specific metrics, wherein to calculate the geographic location score includes causing the processor to further:
calculate a category value for each of the geographic location categories based at least partially on at least one of: the advanced category specific metrics and the default advanced category specific metrics;
calculate a category weight based at least partially on the relative importance of each of the one or more geographic location categories;
calculate a category score for each of the one or more geographic location categories based at least partially on, respectively, the category value and the category weight; and
calculate the geographic location score based at least partially on the category score;
rank each of the one or more geographic locations based at least partially on the geographic location score; and
generate and display, to the user, a graphical user interface that presents interactive objects including at least one of the ranked geographic locations and a preference score related to how close each of the geographic locations is to the user preference, wherein each of the at least one of the ranked geographic locations being displayed in one or more regions of the graphical user interface is based at least upon the respective ranking and the user preference,
wherein the geographic location categories include a budget geographic location category and to calculate the category score for the budget geographic location category includes causing the processor to further:
receive from the user relative importance of saving money and paying for improved lifestyle;
obtain or estimate user financial information;
estimate a budget for one or more geographic locations based at least partially on at least one of user financial information and cost to live at a location; and
calculate a budget category score for each geographic location based at least partially on the specified relative importance of saving money and paying for improving lifestyle, the obtained or estimated user financial information, and the budget.

18. The non-transitory computer-readable storage medium of claim 17, wherein the geographic location categories include a climate category geographic location category and to calculate the climate category score for the climate geographic location category includes causing the processor to further:
receive specified advanced climate category specific metrics for climate that the user finds comfortable;
determine, for each of the geographic locations, a number of days per year that the user will be comfortable based at least partially on the advanced climate category specific metrics; and
calculate the climate category score for each of the geographic locations based at least partially on the number of days per year that the user finds comfortable.

19. The non-transitory computer-readable storage medium of claim 17, wherein the budget is determined as user income minus taxes minus expenses and to calculate the budget category score includes causing the processor to further:
receive an adjustment of at least one slider, by the user, to specify relative importance of saving money and paying for improving lifestyle;
create one or more interpolation functions to map, including:
slider minimum to largest budget of all the locations;
slider mid-point maps to the budget of the user's present location; and
slider maximum maps to the smallest budget of all the locations; and
calculate the budget category score for each of the geographic locations based at least partially on the one or more interpolation functions.

20. The non-transitory computer-readable storage medium of claim 17, wherein the advanced category specific metrics include a diversity advanced category specific metric and the advanced category specific metric is set to one of diversity and a multitude of base categories and to calculate the geographic location score includes causing the processor to further:
calculate fraction of multitude of base categories for each geographic location;
calculate diversity score based at least partially on fraction of base categories when diversity advanced category specific metric is diverse;
calculate diversity advanced category specific metric score based at least partially on diversity score when diversity advanced category specific metric is diverse; and
calculate diversity advanced category specific metric score based at least partially on the fraction of multitude of base categories when diversity advanced category specific metric is one of the multitude of base categories.

\* \* \* \* \*